(12) United States Patent
Delplanche et al.

(10) Patent No.: US 10,661,226 B2
(45) Date of Patent: *May 26, 2020

(54) MULTI-POLLUTANT GAS PURIFICATION PROCESS WITH ALKALI SORBENT AND DENOX SUPPORTED CATALYST COMPRISING CA-DEFICIENT HYDROXYAPATITE

(71) Applicant: Solvay SA, Brussels (BE)

(72) Inventors: Thierry Delplanche, Mont-St-Guibert (BE); Antonella Gervasini, Milan (IT)

(73) Assignee: Solvay SA, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/464,069

(22) PCT Filed: Dec. 7, 2017

(86) PCT No.: PCT/EP2017/081821
§ 371 (c)(1),
(2) Date: May 24, 2019

(87) PCT Pub. No.: WO2018/104446
PCT Pub. Date: Jun. 14, 2018

(65) Prior Publication Data
US 2019/0381453 A1    Dec. 19, 2019

Related U.S. Application Data

(60) Provisional application No. 62/431,407, filed on Dec. 7, 2016, provisional application No. 62/431,406, filed on Dec. 7, 2016.

(51) Int. Cl.
| | | |
|---|---|---|
| *B01D 53/86* | (2006.01) | |
| *B01J 23/00* | (2006.01) | |
| *B01J 23/02* | (2006.01) | |
| *B01J 23/72* | (2006.01) | |
| *B01J 35/10* | (2006.01) | |
| *B01D 53/50* | (2006.01) | |
| *B01J 37/30* | (2006.01) | |

(52) U.S. Cl.
CPC ......... *B01D 53/8628* (2013.01); *B01D 53/50* (2013.01); *B01J 23/002* (2013.01); *B01J 23/02* (2013.01); *B01J 23/72* (2013.01); *B01J 35/108* (2013.01); *B01J 35/1014* (2013.01); *B01J 35/1019* (2013.01); *B01J 35/1038* (2013.01); *B01J 35/1042* (2013.01); *B01J 35/1057* (2013.01); *B01J 35/1061* (2013.01); *B01J 37/30* (2013.01); *B01D 2251/304* (2013.01); *B01D 2251/404* (2013.01); *B01D 2251/606* (2013.01); *B01D 2255/20761* (2013.01)

(58) Field of Classification Search
CPC .............. B01D 53/565; B01D 53/8628; B01D 53/9413; B01D 2255/00; B01D 2255/20761; B01D 2257/402; B01D 2257/404; B01D 2258/012; B01J 23/72; B01J 32/00; F01N 3/2066; C01F 11/00; C01F 11/02; C01B 13/00; C01B 25/32; C01B 25/40

See application file for complete search history.

(56) References Cited

U.S. PATENT DOCUMENTS

| | | | |
|---|---|---|---|
| 4,961,917 A | 10/1990 | Byrne | |
| 5,158,756 A | 10/1992 | Ogawa et al. | |
| 5,695,728 A * | 12/1997 | Miura | B01D 53/9418 423/239.2 |
| 6,117,405 A | 9/2000 | Frey et al. | |
| 7,989,258 B2 * | 8/2011 | Watanabe | C03C 17/3417 438/99 |

(Continued)

FOREIGN PATENT DOCUMENTS

| | | |
|---|---|---|
| EP | 3006105 B1 | 4/2016 |
| EP | 2653219 B1 | 12/2016 |

(Continued)

OTHER PUBLICATIONS

Jihene Jemal et al. "NO reduction with NH3 under oxidizing atmosphere . . . " Applied Catalysis B; Environmental vol. 113-114, Feb. 1, 2012, pp. 255-260. (Year: 2012).*

Hassib Tounsi et al. "Copper loaded hydroxyapatite catalyst . . . " Applied Catalysis B; Environmental, vol. 107, No. 1, Jul. 3, 2011, pp. 158-163 (Year: 2011).*

Choi et al., TPD Study of Mordenite-Type Zeolites for Selective Catalytic Reduction of NO by NH3, Journal of Catalysis, 1996, vol. 161, pp. 597-604, Korea.

(Continued)

*Primary Examiner* — Timothy C Vanoy
(74) *Attorney, Agent, or Firm* — Beatrice C. Ortego

(57) ABSTRACT

Process for treating a combustion waste gas stream containing NOx and contaminants such as heavy metals and/or acid gases, e.g., halogens, SOx, comprising: injecting an alkali sorbent, into the waste gas stream; removing some contaminants with the alkali sorbent from the waste gas stream; injecting an ammonia source into the gas stream; injecting a deNOx catalyst into the gas stream at a temperature of 100° C. to preferably not more than 600° C. to reduce with NH3, in the presence of $O_2$, some NOx to $N_2$ and water in the gas stream, wherein the deNOx catalyst comprises copper and/or copper oxide deposited on a porous support comprising at least 60 wt % of a calcium-deficient hydroxyapatite having a Ca/P of less than 1.67. A blend comprising the alkali sorbent and the deNOx catalyst may be formed to inject them together into the waste gas stream. The ammonia source and the deNOx catalyst are preferably injected simultaneously. Alternatively, the ammonia source may be included in the alkali sorbent and/or the deNOx catalyst.

20 Claims, 8 Drawing Sheets

(56) References Cited

U.S. PATENT DOCUMENTS

| | | |
|---|---|---|
| 8,293,199 B2 | 10/2012 | Beutel et al. |
| 2002/0061271 A1 | 5/2002 | Zauderer |
| 2005/0123773 A1* | 6/2005 | Watanabe ............... C03C 17/22 |
| | | 428/432 |
| 2010/0006506 A1 | 1/2010 | Tahon et al. |
| 2010/0215860 A1* | 8/2010 | Watanabe ........... C03C 17/3417 |
| | | 427/384 |
| 2010/0229542 A1* | 9/2010 | Andy ................. B01D 46/2429 |
| | | 60/301 |
| 2011/0165052 A1 | 7/2011 | Beutel et al. |
| 2012/0245024 A1* | 9/2012 | Chaput .................... B01J 21/16 |
| | | 502/339 |
| 2014/0274665 A1 | 9/2014 | Vaarkamp et al. |
| 2014/0371058 A1* | 12/2014 | Nagao ................ B01D 53/9445 |
| | | 502/263 |
| 2015/0133292 A1* | 5/2015 | Nakata ................ B01D 53/945 |
| | | 502/213 |
| 2018/0169573 A1* | 6/2018 | Delplanche ............ B01J 20/041 |

FOREIGN PATENT DOCUMENTS

| | | |
|---|---|---|
| EP | 2653220 B1 | 12/2016 |
| EP | 2656913 B1 | 12/2016 |
| JP | 63267421 A * 11/1988 | ............. B01D 53/56 |
| WO | WO 2008/095921 A2 | 8/2008 |
| WO | WO 2008/106519 A1 | 9/2008 |
| WO | WO 2010/094021 A2 | 8/2010 |
| WO | WO 2015/118165 A1 | 8/2015 |
| WO | WO2015/118166 A1 | 8/2015 |
| WO | WO 2015/173437 A1 | 11/2015 |
| WO | WO 2016/002344 A1 | 1/2016 |
| WO | WO 2016/193429 A1 | 12/2016 |

OTHER PUBLICATIONS

Putluru et al., Alkali resistant Cu/zeolite deNOx catalysts for flue gas cleaning in biomass fired applications, Applied Catalysis B: Environmental, 2011, vol. 101, pp. 183-188, Denmark.

Jemal et al., Characterization and deNOx activity of copperhydroxyapatite catalysts prepared by wet impregnation, Reac. Kinet. Mech. Cat, 2013, vol. 109, pp. 159-165.

Jemal Et Al., Selective catalytic reduction of NO by NH3 over copper-hydroxyapatite catalysts: effect of the increase of the specific surface area of the support, React Kinet Mech Cat, 2014.

Zhao et al., Simultaneous Removal of SOx and NOx in Flue Gas at Power Stations over a Cu/Na-13X Zeolite Catalyst, Advanced Materials Research, vol. 650, (2013), pp. 125-129.

* cited by examiner deNOx reaction with Cu-exchanged catalysts at 250°C deNOx reaction with Cu-exchanged catalysts at 350°C deNOx reaction with Cu-impregnated catalysts at 250°C deNOx reaction with Cu-impregnated catalysts at 350°C

MULTI-POLLUTANT GAS PURIFICATION PROCESS WITH ALKALI SORBENT AND DENOX SUPPORTED CATALYST COMPRISING CA-DEFICIENT HYDROXYAPATITE

CROSS-REFERENCE TO RELATED APPLICATIONS

The present application is a U.S. national stage entry under 35 U.S.C. § 371 of International Application No. PCT/EP2017/081821 filed Dec. 7, 2017, which claims priority benefit to U.S. provisional applications No. 62/432,406 and No. 62/432,407, both filed on Dec. 7, 2016, the whole content of these applications being incorporated herein by reference for all purposes.

TECHNICAL FIELD

The invention pertains to the field of waste gas purification. Particularly, an embodiment of the invention relates to a process for treating a waste gas containing pollutants (e.g., nitrogen oxides, acid gases like HCl, HF, sulfur oxides, heavy metals such as Hg, As) using injection into the waste gas to be treated of an alkali sorbent and of a deNOx copper supported catalyst comprising a hydroxyapatite.

BACKGROUND

When burning fossil fuels to produce energy, one typically uses a high temperature combustion process in the presence of air. Unfortunately, this type of process produces an gas effluent which comprises gaseous by-products of combustion including nitrogen oxides (NOx), carbon monoxide, and acid compounds such as sulfur dioxide ("$SO_2$"), sulfur trioxide ("$SO_3$"), hydrochloric acid ("HCl"), hydrofluoric acid ("HF"), The gas effluent may also contain unburned hydrocarbons and volatile heavy metals which originate from the fossil fuels.

Most of the NOx formed during the combustion process is the result of two oxidation mechanisms: (1) reaction of nitrogen in the combustion air with excess oxygen at elevated temperatures, referred to as thermal NOx; and (2) oxidation of nitrogen that is chemically bound in the coal, referred to as fuel NOx.

Nitrogen oxides (NOx) are well-known pollutants, and sulfur oxides (SOx) are harmful to health or the environment. Due to their significant impacts on the environment and health, there has been a growing environmental concern on SOx, NOx emissions to the atmosphere in the past two decades thus the importance to remove these materials from the combustion gas effluents prior to their release into the environment. Flue gas at coal-fired power stations is one of the main sources for the emissions of SOx and NOx. More and more stringent regulations on the emission of these pollutants come in force, which have put a high pressure on coal-fired power generators.

There have been many investigations into methods that allow for the removal of these substances. The methods developed and used are generally designed to address the removal of one type of pollutants.

Reducing NOx emissions is generally achieved by controlling the formation of NOx through combustion controls and/or by removing NOx after being formed through post-combustion controls. Adsorption techniques can be used for SOx removal. But combustion modifications and post-combustion control technologies may suffer from limited maximum removal of pollutants and limited capacity.

A method for addressing the problem of noxious waste gases is catalytic removal, which by comparison, is extremely effective in removing large proportions of pollutants and is capable of treating very large volumes of waste gases for long periods of time.

Selective catalytic reduction (SCR) has been one of the most effective technologies for removing NO (the main nitrogen oxide formed at high temperature) from a waste gas effluent originating from a stationary or mobile combustion source. Stationary combustion sources are mainly utility boilers, industrial boilers, incinerators, and cogeneration turbines. Mobile combustion sources are mainly vehicles such as automobiles, trucks.

The SCR process is widely used for example in the U.S., Japan, and Europe to reduce emissions of large utility boilers and other commercial applications. Increasingly, SCR processes are being used to reduce emissions in mobile applications such as in large diesel engines like those found on ships, diesel locomotives, automobiles and the like.

In order to effect the reduction of NOx in waste combustion gases through catalytic reduction processes, it is necessary either to introduce a reducing agent, such as ammonia, and/or to use the unburned hydrocarbons present in the waste gas effluent. The SCR process generally provides the reduction of NOx, (NO, $N_2O$ and $NO_2$) species using the reducing agent (e.g., ammonia) in the presence of oxygen and a catalyst to produce molecular nitrogen and water.

Selective catalytic reduction (SCR) of NO by $NH_3$ as reducing agent in the presence of $O_2$, that causes the formation of $NO_2$ (from the parent NO) in the gas reagent mixture, is a complex reaction can be schematized with the following series of main reactions (I) and (II):

$$4NO+4NH_3+O_2 \rightarrow 4N_2+6H_2O \tag{I}$$

$$2NO_2+4NH_3+O_2 \rightarrow 3N_2+6H_2O \tag{II}$$

Other common reactions that could be taken into account when low $O_2$ concentration is present in the gas mixture are the following reactions (III) and (IV):

$$NO+NO_2+2NH_3 \rightarrow 2N_2+3H_2O \tag{III}$$

$$6NO_2+8NH_3 \rightarrow 7N_2+12H_2O \tag{IV}$$

At temperatures around 300-350° C., competition between the reaction of NO reduction by NH3 and the reaction of NH3 oxidation by oxygen forming NO and/or $N_2$ and/or $N_2O$ can occur, according to the following reactions (V) to (VII):

$$4NH3+5O_2 \rightarrow 4NO+6H_2O \tag{V}$$

$$2NH3+2O_2 \rightarrow N_2O+3H_2O \tag{VI}$$

$$4NH3+3O_2 \rightarrow 2N_2+6H_2O \tag{VII}$$

These last reactions (V) to (VII) sequestrate $NH_3$, the reducing agent, to the SCR process: they are in competition with the previous reactions of NOx reduction. The occurrence of these reactions (V) to (VII) is responsible for the observation of a maximum of the conversion curve of the NOx species as a function of reaction temperature; that is to say, the rate of NOx ($NO+NO_2$) reduction is not continuously increasing with temperature because, staring from a defined temperature, the concentration of the reducing agent (NH3) decreases due to its oxidation by oxygen.

The SCR process is a competitive reaction scheme constituted by series of parallel reactions, the kinetics of each reaction and its dependence on temperature has to be exploited in order to selectively obtain NO reduction by ammonia and to avoid ammonia oxidation by oxygen. Finding a catalytic system to selectively obtain NO reduction by ammonia in a large temperature interval is thus challenging.

Various catalysts have been used in the SCR processes. Catalysts, including various metals, transition metal oxides, and mixed metal oxides have been employed for NO reduction. Initial catalysts, which employed platinum or platinum group metals, were found unsatisfactory because of the need to operate in a temperature range in which explosive ammonium nitrate forms. In response to environmental regulations in Japan, the first vanadium/titanium SCR catalyst was developed, which has proven to be highly successful. Further development has resulted in the development of vanadium catalyst deposited on titanium oxide/tungsten oxide support material.

Metal-promoted zeolite catalysts including, among others, iron-promoted and copper-promoted zeolite catalysts, for the selective catalytic reduction of nitrogen oxides with ammonia are known.

Zeolites are aluminosilicate crystalline materials having rather uniform pore sizes which, depending upon the type of zeolite and the type and amount of cations included in the zeolite lattice, range from about 3 to 10 Angstroms in diameter.

Chabazite (CHA) is a small pore zeolite with 8 member-ring pore openings ("3.8 Angstroms) accessible through its 3-dimensional porosity. A cage like structure results from the connection of double six-ring building units by 4 rings. WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with coppersulfate or copperacetate. The copper concentration of the aqueous copper sulfate ion-exchange step varies from 0.025 to 1 molar, where multiple copper ion-exchange steps are needed to attain target copper loadings. U.S. Pat. No. 8,293,199 describes processes for the preparation of copper containing molecular sieves with the CHA structure having a silica to alumina mole ratio greater than about 10, wherein the copper exchange step is conducted via wet state exchange and prior to the coating step and wherein in the copper exchange step a liquid copper solution is used wherein the concentration of copper is in the range of about 0.001 to about 0.25 molar using copperacetate and/or an ammoniacal solution of copper ions as copper source.

Acidic zeolites such as copper ion-exchanged Y zeolites, H mordenite, and Cu—H mordenite have been reported to be efficient catalysts for NO reduction by $NH_3$, particularly for the high-temperature application of SCR technology—see for example, Choi et al, *Journal of Catalysis* (1996) vol. 161, pages 597-604; Putluru et al, *Applied Catal. B: Environmental* (2011) vol. 101, pages 183-188.

Iron-promoted zeolite beta (U.S. Pat. No. 4,961,917) has been an effective commercial catalyst for the selective reduction of nitrogen oxides with ammonia.

Unfortunately, it has been found that under harsh hydrothermal conditions, for example exhibited during regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The catalysts employed in the SCR process ideally should be able to retain good catalytic activity over the wide range of temperature conditions of use, for example, from 200° C. to 600° C. or higher, preferably under hydrothermal conditions since water is generated during NOx reduction (see reactions (I) and (II) above). Hydrothermal conditions are also encountered in practice, such as during the regeneration of a soot filter, a component of the exhaust gas treatment system used for the removal of particles.

There are two basic options for controlling SOx emissions from coal-fired power plants, which is formed from the oxidation of sulfur in the fuel: (1) switching to lower sulfur fuels; and (2) SOx capture, including Flue Gas Desulfurization (FGD), or more commonly referred to as "scrubbing."

Traditional flue gas desulfurizer (FGD) systems are built for the express purpose of removing SOx from the exhaust flue gases of fossil-fuel power plants and sometimes from the emissions of other SOx emitting industrial processes. These systems generally employ five removal methods:

wet scrubbing that uses alkaline sorbent or seawater to scrub the flue gas;
the spray-dry scrubbing that uses similar sorbent slurries;
wet sulfuric acid process that recovers sulfur in the form of sulfuric acid;
SNOX flue gas desulfurization that removes sulfur dioxide, nitrogen oxides and particulates from flue gases; and
dry sorbent injection systems FGDs employ two stages: one to remove fly ash and the other to remove SOx. In wet scrubbing systems, the flue gas passes through a fly ash removal device, either an electrostatic precipitator or a wet scrubber, and then into the SOx-absorber. In dry injection or spray drying operations, the SOx reacted first with the sorbent, and then the flue gas passes through a particulate control device.

Cost-effective and sustainable technologies for the reduction of such pollutants (emissions targeted include NOx, SOx, mercury and other heavy metals, halogens and particulate matter) from flue gas have become increasingly important nowadays. With multi-pollutant emissions control technologies, a single system should be able to remove multiple pollutants from flue gas before they are released into the atmosphere. A considerable advantage of a multi-pollutant strategy is lower capital investment when compared with investing in several different technologies to address each pollutant. Likewise, the installation of a single unit is faster and requires less downtime. This is especially relevant due quickly approaching deadlines. Also, multi-pollutant technologies generally require a smaller footprint since their processes are encapsulated in one system.

Despite the advantages of multi-pollutant emissions control technologies, there is still a barrier to larger scale deployment in the power sector because there is a level of comfort in using the traditional emissions control technologies because they have been used by the industry for years. The owners of fossil-fired power plants know the capital investment, and operations and maintenance, costs of older technologies and operators can more easily anticipate problems that may arise.

Even though numerous attempts have been made aiming at developing technologies for the removal of SOx and NOx, not much effort has been made on the simultaneous conversion of NOx and SOx in flue gas, especially for once-through applications in which treatment material is injected into the waste gas stream and where the contact time between the injected treatment material and the contaminated gas containing these Sox, NOx pollutants may be short in the order of a second to a few seconds.

SUMMARY OF INVENTION

An embodiment of the present invention relates to a process for treating a waste gas stream containing nitrogen oxides (NOx) and contaminants selected from the group consisting of heavy metals, acid gases (such as $SO_2$, $SO_3$, $H_3PO_4$, HCl, HI, HBr, and/or HF) and combinations thereof, said waste gas stream originating from a combustion process. The process comprises:

injecting an alkali sorbent into the waste gas stream, said alkali sorbent comprising a compound selected from the group consisting of sodium bicarbonate, sodium carbonate, sodium sesquicarbonate (trona), quick lime, hydrated lime, limestone, and combinations thereof;

contacting at least a portion of the contaminants with the alkali sorbent to remove at least a portion of the contaminants from the waster gas stream, injecting an ammonia source into the waste gas stream;
injecting a catalyst into the waste gas stream; and
converting, in the presence of $O_2$, by reduction with $NH_3$ of at least a portion of the NOx in the waste gas stream to $N_2$ and water at a temperature of at least 100° C. and preferably at most 600° C., wherein the catalyst comprises an active catalyst component deposited on a porous support;
wherein said active catalyst component comprises copper, copper oxide, or combination thereof; and
wherein said porous support comprises at least 60 wt % of a calcium-deficient hydroxyapatite having a calcium to phosphate molar ratio (Ca/P) of less than 1.67, preferably more than 1.5 and less than 1.67.

Another embodiment of the present invention relates to a blend comprising an alkali sorbent and a catalyst, said alkali sorbent comprising compound selected from the group consisting of sodium bicarbonate, sodium carbonate, sodium sesquicarbonate (trona), quick lime, hydrated lime, limestone, and combinations thereof, wherein the blend comprises at least 0.1 wt %, or at least 0.2 wt %, or at least 0.5 wt %, or at least 1 wt %, or at least 3 wt %, or at least 5 wt %, of the catalyst, and/or
at most 20 wt %, or at most 15 wt %, or at most 12 wt %, or at most 10 wt %, of the catalyst;

said catalyst comprising an active catalyst component deposited on a porous support;
wherein said active catalyst component comprises copper, copper oxide, or combination thereof;
wherein said porous support comprises at least 60 wt % of a calcium-deficient hydroxyapatite having a calcium to phosphate molar ratio (Ca/P) of less than 1.67, preferably more than 1.5 and less than 1.67.

The blend may comprise:
at least 0.1 wt %, or at least 0.2 wt %, or at least 0.5 wt %, or at least 1 wt %, or at least 3 wt %, or at least 5 wt %, of the catalyst, and/or
at most 20 wt %, or at most 15 wt %, or at most 12 wt %, or at most 10 wt %, of the catalyst.

Another embodiment of the present invention relates to the use of the blend in a process for treating a waste gas stream containing nitrogen oxides (NOx) and contaminants selected from the group consisting of heavy metals, acid gases (such as $SO_2$, $SO_3$, $H_3PO_4$, HCl, HI, HBr, and/or HF) and combinations thereof, said waste gas stream originating from a combustion process. The treating process comprises:

injecting the blend comprising the alkali sorbent and the catalyst into the waste gas stream;
removing at least a portion of the contaminants from the waste gas stream with the alkali sorbent, and
converting with the catalyst, in the presence of $O_2$, by reduction with $NH_3$ of at least a portion of the NOx in the waste gas stream to $N_2$ and water at a temperature of at least 100° C. and preferably at most 600° C.

In the process, the temperature of the gas to be treated may be at least 105° C., preferably at least 120° C., more preferably at least 180° C.; and/or at most 400° C., preferably at most 350° C., more preferably at most 300° C.

The catalyst used in the process or blend according to the invention may have a BET specific surface area measured after being calcined at 400° C. of at least 65 $m^2/g$ and/or at most 100 $m^2/g$.

The catalyst used in the process or blend according to the invention may have a pore volume measured after being calcined at 400° C. of:
at least 0.3 $cm^3/g$, preferably of at least 0.41 $cm^3/g$, and/or
at most 1.1 $cm^3/g$, preferably of at most 1.0 $cm^3/g$, more preferably of at most 0.9 $cm^3/g$. most preferably of at most 0.8 $cm^3/g$.

In an advantageous embodiment of the invention, the porous material or support is obtained or may be obtainable by the process of any items 1 to 16 of this patent application described herein below.

The porous material or support may be a material according to any items 17 to 30 of this patent application described herein below.

The porous material or support is advantageously a material according to any items 31 to 44 of this patent application described herein below.

The porous material or support may be used in the form of a wet solid (D'), or a pulverulent solid (D"), preferably a pulverulent solid (D"), when the support particles are loaded with copper.

The catalyst containing the active metallic component on the porous material or support is advantageously a material according to any items 45 to 55 of this patent application described herein below.

In another embodiment of the invention, it is particularly advantageous that the catalyst according to any of the embodiments presented herein comprising is brought into contact with a waste gas stream containing nitrogen oxides (NOx).

DEFINITIONS

Figure 1:
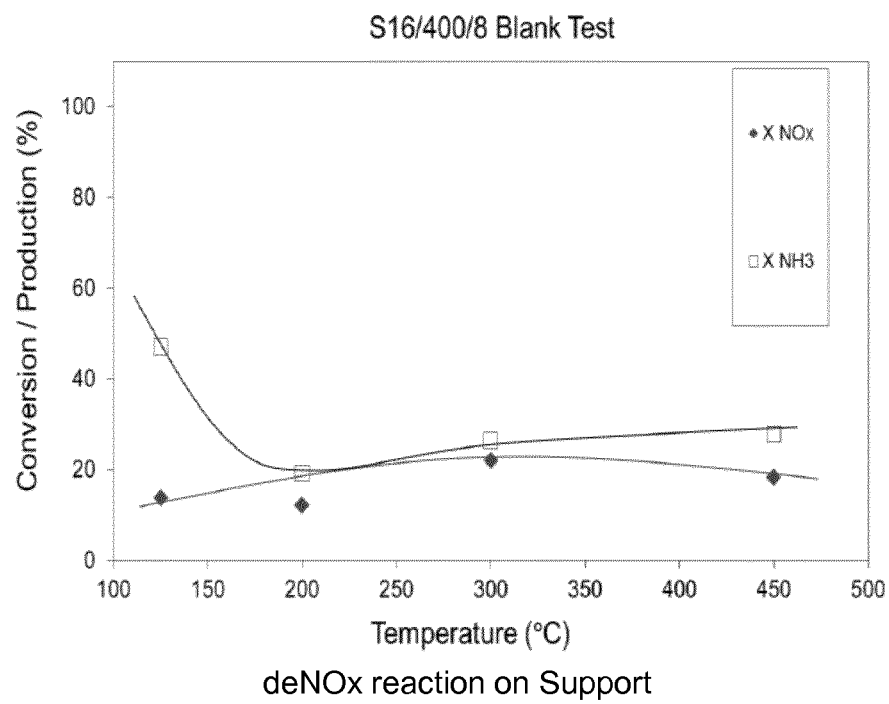
FIG. 1 illustrates the conversion of NO and $NH_3$ over a hydroxyapatite-based support over the range of temperature 120-450° C. in a $NH_3$—SCR reaction test.

Unless otherwise specified, all reference to percentage (%) herein refers to percent by weight.

As used herein, the terms "% by weight", "wt %", "wt. %", "weight percentage", or "percentage by weight" are used interchangeably.

The terms "catalyst support," "support particles," or "porous support" are intended to have their standard meaning in the art and refer to a porous material in the form of particles comprising a hydroxyapatite structure on the surface of which an active metal component can be deposited.

The terms "active metal catalyst" or "active component" refer to the active component deposited on support material that catalyzes the reduction of NOx compounds.

The term "catalyst" (or "catalyst composition") is intended to have its standard meaning in the art and refers to the combination of the active metal catalyst supported on the catalyst support particles.

"Fresh" catalyst denotes a material which has not been in contact with NOx, whereas "spent" catalyst denotes a material which has already been in contact with NOx.

The term "trona" is intended to mean a mineral containing at least 60%, preferably at least 80%, more preferably at least 90%, even more preferably at least 95% by weight of sodium sesquicarbonate ($NaHCO_3 \cdot Na_2CO_3 \cdot 2H_2O$). The remainder of the mineral generally consists of clays, or carbonate of calcium or magnesium.

As used herein, the term "upstream" refers to a position situated in the opposite direction from that in which the gas stream to be treated flows.

As used herein, the term "downstream" refers to a position situated in the same direction from that in which the gas stream to be treated flows.

As used herein, the terms "% by weight", "wt %", "wt. %", "weight percentage", or "percentage by weight" are used interchangeably.

In the present specification, the choice of an element from a group of elements also explicitly describes:
  the choice of two or the choice of several elements from the group,
  the choice of an element from a subgroup of elements consisting of the group of elements from which one or more elements have been removed.

In addition, it should be understood that the elements and/or the characteristics of a composition, a method, a process or a use, described in the present specification, can be combined in all ways possible with the other elements and/or characteristics of the composition, method, process, or use, explicitly or implicitly, this being without departing from the context of the present specification.

In the passages of the present specification that will follow, various embodiments or items of implementation are defined in greater detail. Each embodiment or item of implementation thus defined can be combined with another embodiment or with another item of implementation, this being for each mode or item unless otherwise indicated or clearly incompatible when the range of the same parameter of value is not connected. In particular, any variant indicated as being preferred or advantageous can be combined with another variant or with the other variants indicated as being preferred or advantageous.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

The term "comprising" includes "consisting essentially of" and also "consisting of".

In the present specification, the use of "a" in the singular also comprises the plural ("some"), and vice versa, unless the context clearly indicates the contrary. By way of example, "a mineral" denotes one mineral or more than one mineral.

If the term "approximately" is used before a quantitative value, this corresponds to a variation of ±10% of the nominal quantitative value, unless otherwise indicated.

DETAILED DESCRIPTION OF INVENTION

Porous Support

In the text of the application, the "porous support" may be referred to as the "calcium phosphate porous support"; these terms can be used interchangeably.

An embodiment of the present invention relates to a porous material or support comprising at least 60 wt % of a calcium-deficient hydroxyapatite having a calcium to phosphate molar ratio (Ca/P) of less than 1.67, preferably more than 1.5 and less than 1.67.

The porous material or support generally comprises or at least 60 percent by weight (wt %), or at least 65 wt %, or at least 70 wt %, or at least 75 wt % percent by weight of the calcium-deficient hydroxyapatite.

The porous material or support may consist of or consist essentially of at least one calcium-deficient hydroxyapatite, as described herein.

The calcium-deficient hydroxyapatite is generally in the present invention in crystalline form or in vitreous form.

In preferred embodiments, the porous material or support may further include one or more additional components different from the calcium-deficient hydroxyapatite.

The porous material or support may have a particularly high BET specific surface area (at least 110 m$^2$/g) and/or a particularly high pore volume (at least 0.41 cm$^3$/g) measured after heat treatment of the porous support at 120° C.

The porous material may have a BET specific surface area measured after heat treatment at 200° C. of at least 120 m$^2$/g and/or at most 160 m$^2$/g.

The porous material or support may have a BET specific surface area measured after heat treatment at 400° C. of at least 60 m$^2$/g and/or at most 100 m$^2$/g.

The porous material or support may have a pore volume measured after heat treatment at 200° C. of at least 0.55 cm$^3$/g, preferably of at least 0.55 cm$^3$/g and/or at most 1.0 cm$^3$/g, preferably of at most 0.95 cm$^3$/g. The porous material may serve as a porous support for a supported catalyst.

The porous material or support may further comprise calcium carbonate in an amount of less than 20 wt % and more than 0 wt %, preferably from 1 wt % to 19 wt %, more preferably from 2 wt % to 18 wt %, even more preferably from 5 wt % to 15 wt %, yet even more preferably from 7 wt % to 13 wt %, most preferably from 8 wt % to 12 wt %.

The porous material or support may further comprise less than 1 wt % of calcium dihydroxide Ca(OH)$_2$, preferably less than 0.5 wt % calcium dihydroxide Ca(OH)$_2$, more preferably less than 0.3 wt % calcium dihydroxide Ca(OH)$_2$, even more preferably less than 0.2 wt % calcium dihydroxide Ca(OH)$_2$, most preferably being substantially free of calcium dihydroxide Ca(OH)$_2$.

The porous material or support may further comprise water in an amount of less than 20 wt % and more than 0 wt %, preferably from 1 wt % to 18 wt %, more preferably from 2 wt % to 15 wt %, even more preferably from 4 wt % to 12 wt %, yet even more preferably from 5 wt % to 11 wt % most preferably from 6 wt % to 11 wt %.

The porous material or support may comprise a Ca/P molar ratio of 1.60 or more, preferably of 1.65 or more, preferably of 1.67 or more, more preferably of 1.68 or more.

The porous material may comprise a Ca/P molar ratio greater than the Ca/P molar ratio of the calcium-deficient hydroxyapatite.

The porous material or support may comprise at least 65 wt %, preferably at least 70 wt %, more preferably at least 75 wt %, yet more preferably at least 80 wt %, yet most preferably at least 85 wt %, of the calcium-deficient hydroxyapatite, and/or at most 99 wt %, preferably at most 98 wt %, more preferably at most 97 wt %, yet more preferably at most 95 wt %, even more preferably at most 93 wt %, most preferably at most 91 wt % of the calcium-deficient hydroxyapatite.

The porous material or support may have a pore volume measured after heat treatment at 400° C. of at least 0.50 cm$^3$/g, preferably of at least 0.60 cm$^3$/g and/or of at most 1 cm$^3$/g.

The porous support used in the catalyst of the present invention preferably consists of particles. In some embodiments, the mean diameter D50 of the porous support is greater than 10 μm, in general greater than 20 μm, or even greater than 50 μm. However, this mean diameter of the porous support is in general preferably less than 200 μm, or even less than 150 μm. This makes it possible to limit the stirring powers to prevent the particles of the porous support from needing high velocities of waste gases to be treated at the injection points of the catalyst for the treatment of the waste gases.

Moreover the porous support may have a particularly high BET specific surface area (at least 110 m$^2$/g) measured after treatment of the porous support at 120° C.

The porous support may have a particularly high pore volume (at least 0.41 cm$^3$/g) measured after heat treatment of the porous support at 120° C.

Particularly, the porous support may have a high adsorption capacity of metals, in particular of copper.

In particular embodiments, the porous support has a BET specific surface area measured after heat treatment at 200° C. of at least 120 m$^2$/g and/or at most 160 m$^2$/g.

In particular embodiments, the porous support has a BET specific surface area measured after heat treatment at 600° C. of at least 20 m$^2$/g and/or at most 40 m$^2$/g.

In particular embodiments, the porous support has a pore volume measured after heat treatment at 200° C. of at least 0.55 cm$^3$/g, preferably of at least 0.55 cm$^3$/g and/or at most 1.0 cm$^3$/g, preferably of at most 0.95 cm$^3$/g.

In particular embodiments, the porous support has a pore volume measured after heat treatment at 600° C. of at least 0.42 cm$^3$/g, preferably of at least 0.44 cm$^3$/g and/or at most 0.8 cm$^3$/g, preferably of at most 0.75 cm$^3$/g.

For comparison, natural apatites found in Moroco for instance have specific surface areas of about 16 m$^2$/g. Synthetic hydroxyapatites made by Dalahay's group at the Ecole Nationale Superieure de Montpellier, France, have specific BET surface areas of about 26 m$^2$/g (Tounsi et al, *Applied Catalysis B: Environmental*, 2011, vol. 107, pages 158-163); and about 44 m$^2$/g (Jemal et al, *Reac. Kinet. Mech. Cat*, 2013, vol. 109, pages 159-165).

In Jemal et al, *Reac. Kinet. Mech. Cat*, 2013, vol. 109, pages 159-165, a synthetic hydroxyapatite made using an aqueous medium had a BET about 35 m$^2$/g and a pore volume of 0.4 cm$^3$/g, while another synthetic hydroxyapatite made using an ethanol-water medium had a BET about 72 m$^2$/g and a pore volume of 0.34 cm$^3$/g.

The porous support should comprise at least 60 wt % of a calcium-deficient hydroxyapatite having a calcium to phosphate molar ratio (Ca/P) of less than 1.67.

It is preferred that the calcium-deficient hydroxyapatite has a calcium to phosphate molar ratio (Ca/P) of more than 1.5 and less than 1.67.

In particular embodiments, the porous support comprises at least 65 wt %, preferably at least 70 wt %, more preferably at least 75 wt %, yet more preferably at least 80 wt %, yet most preferably at least 85 wt %, of the calcium-deficient hydroxyapatite.

In particular embodiments, the porous support comprises at most 99 wt %, preferably at most 98 wt %, more preferably at most 97 wt %, yet more preferably at most 95 wt %, even more preferably at most 93 wt %, most preferably at most 91 wt % of the calcium-deficient hydroxyapatite.

In particular embodiments, the porous support may comprise a Ca/P molar ratio of 1.60 or more, preferably more than 1.62, more preferably more than 1.65.

In some embodiments, the porous support may comprise a Ca/P molar ratio of 1.60 or more, preferably of 1.62 or more, more preferably of 1.65 or more, even more preferably of 1.67 or more, most preferably of 1.68 or more.

The porous support particles are preferably composed of calcium phosphate, the structure of which is intermediate between tricalcium phosphate and calcium phosphate hydroxyapatite. These particles then evolve very rapidly towards an apatite structure. The porous support particles preferably contain a calcium-deficient hydroxyapatite structure having a calcium to phosphate molar ratio (Ca/P) of less than 1.67. It is preferred that the calcium-deficient hydroxyapatite has a calcium to phosphate molar ratio (Ca/P) of more than 1.5 and less than 1.67.

Such porous support particles are composed on their surface of plate-like crystallites, of thickness of a few nano-meters (nm).

Particles of calcium phosphate porous support may be covered with plate-like crystallites, having a thickness of at most 25 nm, preferably of at most 20 nm, more preferably of at most 10 nm. The thickness of plate-like crystallites may be at least 1 nm, preferably at least 2 nm, more preferably at least 4 nm.

The porous support used in the present invention may further have a remarkably low solubility of the phosphates contained in the porous support particles.

The particles of the calcium phosphate porous support used in the catalyst of the present invention in general comprise at least 60 wt % calcium phosphate and advantageously still at least 65 wt % calcium phosphate.

The particles of the calcium phosphate porous support may further comprise: water, of the order of from 0 to 20 wt %, advantageously from 3% to 20 wt %, more advantageously from 5 wt % to 20 wt %; calcium carbonate from 0 to 20 wt %, advantageously from 1 wt % to 25 wt %, more advantageously from 5 wt % to 20 wt %.

In some embodiments, the particles of the calcium phosphate porous support may further comprises calcium carbonate in an amount of less than 20 wt % and more than 0 wt %, preferably from 1 wt % to 19 wt %, more preferably from 2 wt % to 18 wt %, even preferably from 5 wt % to 15 wt %, yet even more preferably from 7 wt % to 13 wt %, most preferably from 8 wt % to 12 wt %.

The particles of the calcium phosphate porous support may further comprise: water, of the order of from 0 to 20 wt %, advantageously from 3% to 20 wt %, more advantageously from 5 wt % to 20 wt %; calcium carbonate from 0 to 20 wt %, advantageously from 1 wt % to 25 wt %, more advantageously from 5 wt % to 20 wt %.

The particles of the calcium phosphate porous support may further comprise calcium dihydroxide from 0 to 20%, advantageously from 0% to 4%, or more advantageously from 0 to 1 wt %. In some embodiments, the porous support may comprise less than 1 wt % of calcium dihydroxide $Ca(OH)_2$, preferably less than 0.5 wt % calcium dihydroxide, more preferably less than 0.3 wt % calcium dihydroxide, even more preferably less than 0.2 wt % calcium dihydroxide. In some embodiments, the porous support is substantially free of calcium dihydroxide (i.e., less than 0.1 wt % $Ca(OH)_2$).

The particles of calcium phosphate porous support may additionally contain residual compounds originating from the use of the raw materials in the method of making it, such as: $CaCl_2$, $Ca(NO_3)_2$, sands or clays; these constituents are in general less than 5 wt %, advantageously less than 2 wt %.

The term "apatite" denotes a family of mineral compounds, the chemical formula of which can be written in the following general form:

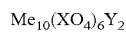

$$Me_{10}(XO_4)_6Y_2$$

In this formula, Me generally represents a divalent cation ($Me^{2+}$), $XO_4$ a trivalent anionic group ($XO_4^{3-}$) and Y a monovalent anion ($Y^-$).

Calcium phosphate hydroxyapatite $Ca_{10}(PO_4)_6(OH)_2$ crystallizes in the space group of the hexagonal system. This structure consists of a close-packed quasi-hexagonal stack of $XO_4$ groups, forming two types of parallel tunnels.

The existence of these tunnels gives apatites chemical properties akin to those of zeolites. Vacancies may also be created either by the departure of anions and cations, or by the presence of cations or anions of different valency. Apatites therefore appear to be particularly stable structures which may tolerate large gaps in their composition.

Hydroxyapatite should not be confused with tricalcium phosphate (TCP), which has a similar weight composition: $Ca_3(PO_4)_2$. The Ca/P molar ratio of TCP is 1.5 whereas the Ca/P molar ratio is 1.67 for hydroxyapatite. Industrial apatites sold as food additives or mineral fillers are, as a general rule, variable mixtures of TCP and hydroxyapatite.

The present hydroxyapatite in the porous support is deficient in calcium compared to a hydroxyapatite with a Ca/P molar ratio of 1.67. The Ca/P molar ratio of the calcium-deficient hydroxyapatite is preferably more than 1.5 and less than 1.67.

Calcium may be and is preferably present in another form (other than the calcium-deficient hydroxyapatite) in the porous support. Calcium carbonate is generally present in the porous support. The weight ratio of the calcium-deficient hydroxyapatite to calcium carbonate is generally equal to or greater than 3, preferably equal to or greater than 4, more preferably equal to or greater than 5, yet more preferably greater than 7, most preferably equal to or greater than 9.

Generally, because of that other form of Ca in the porous support, the porous support generally has a higher Ca/P molar ratio than the calcium-deficient hydroxyapatite present in the porous support. For that reason, even though the calcium-deficient hydroxyapatite in the porous support may have a Ca/P molar ratio less than 1.67, the entire porous support may have a Ca/P molar ratio equal to or more than 1.67. In preferred embodiments, the calcium-deficient hydroxyapatite in the porous support may have a Ca/P molar ratio of about 1.55-1.59, while the porous support may have a Ca/P molar ratio of about 1.60-1.67.

Other salts of calcium and phosphate, including TCP, do not have the same properties as hydroxyapatite or a hydroxyapatite like structure. Although TCP can also react with metals, a hydroxyapatite of Ca/P=1.67 as well as a calcium-deficient hydroxyapatite (Ca/P<1.67) are more advantageous as they can enclose metals in the form of an insoluble, and therefore relatively inert, matrix.

Method for Making the Porous Support

The process for producing the calcium phosphate porous support may comprise:

in a first step, use is made of a source of calcium and a source of phosphate ions in water, in a molar ratio that is adjusted so as to obtain a Ca/P molar ratio of between 0.5 and 1.6, and the source of calcium is reacted with the phosphate ions at a pH of between 2 and 8, in order to obtain a suspension (A) of calcium phosphate, and in a second step, added to the suspension (A) are an alkaline compound comprising hydroxide ions in order to set a pH of more than 8, preferably of at least 8.5, and an additional source of calcium in order to obtain a suspension (B) of calcium phosphate porous support having a Ca/P molar ratio of more than 1.6.

In the process of manufacture, the source of calcium to make the support advantageously comprises calcium carbonate, or calcium oxide, or calcium hydroxide, or calcium chloride, or calcium nitrate, or calcium acetate. The source of calcium is more advantageously a limestone, or a mixture of limestone and calcium oxide or hydroxide. More advantageously, the source of calcium is in the form of powder or aqueous suspension of powder and the powder is selected from the group consisting of: calcium carbonate, calcium oxide, calcium hydroxide, and a mixture thereof, and the powder for the source of calcium has a mean particle size of less than 300 µm.

It is advantageous for the source of calcium selected from the group consisting of: calcium carbonate, calcium oxide, calcium hydroxide, and mixtures thereof to be in the form of a powder or aqueous suspension of powder, and to have a small particle size. In one recommended variant, the mean diameter of the particles of the powder for the calcium source is less than 300 µm, advantageously less than 200 µm and preferably less than 100 µm. The mean diameter in question is the D50, that is to say the diameter such that 50% by weight of the particles have a diameter less than said value.

In the process of manufacture, various sources of phosphate ions to make the support may be used, in particular:

phosphoric acid, or a dihydrogen phosphate salt such as a sodium, potassium or ammonium dihydrogen phosphate salt, preferably a sodium dihydrogen phosphate salt, or a monohydrogen phosphate salt such as a sodium, potassium or ammonium monohydrogen phosphate salt, preferably a sodium monohydrogen phosphate salt.

In the process of manufacture to make the porous support, phosphoric acid is preferred due to its greater availability and lower cost compared to dihydrogen and monohydrogen phosphate salts.

In the process of manufacture to make the porous support, in the first step the Ca/P molar ratio is in particular:

between 0.50 and 1.35, preferably between 0.70 and 1.30, or: between 1.4 and 1.6, preferably between 1.4 and 1.5.

During the first step where calcium and phosphate are used in a Ca/P molar ratio of between 0.5 and 1.6 and where they are reacted at a pH between 2 and 8, the compounds formed in the suspension (A) are a mixture of monocalcium phosphate (MCP) having the weight formula $Ca(H_2PO_4)_2$, of dicalcium phosphate (DCP) having the weight formula $CaHPO_4$, or the hydrate thereof, brushite, having the weight formula $CaHPO_4.2H_2O$, and of octacalcium having the weight formula $Ca_8H_2(PO_4)_6.6.5H_2O$. The Ca/P molar ratios are respectively for these compounds: 0.5 (MCP), 1.0 (DCP and brushite), 1.33 (octacalcium).

In order to promote, in the first step, the formation of MCP and DCP, a Ca/P ratio of between 0.50 and 1.35, preferably between 0.7 and 1.30, is favored. This Ca/P molar ratio is particularly advantageous when the source of calcium from the first step comprises calcium carbonate, and the source of phosphate is phosphoric acid ($H_3PO_4$) or is a dihydrogen phosphate salt such as a sodium or potassium or ammonium salt. Specifically, this makes it possible to obtain a rapid attack of the calcium carbonate and a rapid degassing of the $CO_2$. In addition to calcium carbonate, the source of calcium may comprise calcium oxide, or calcium hydroxide, or calcium chloride, or calcium nitrate, or calcium acetate.

In order to promote, in the first step, the formation of DCP and octacalcium, a Ca/P ratio of between 1.4 and 1.6, preferably between 1.4 and 1.5, is favored. This molar ratio is advantageous when use is made of a source of calcium having less than 30% by weight of carbonate, such as preferably: calcium oxide, or calcium hydroxide, or calcium chloride, or calcium nitrate, or calcium acetate.

In the method of manufacture to make the porous support, in the first step, the source of calcium and the phosphate ions are in general reacted for at least 0.1 hour, preferably at least 0.5 hour. It is not useful to react them over excessively long periods of time. Advantageously, the source of calcium and the phosphate ions are reacted for at most 4 hours, more advantageously at most 2 hours, or even at most 1 hour. For example, a time period of 1 hour at pH 5 already enables a good reaction of the calcium and the phosphate ions, and makes it possible to sufficiently release the $CO_2$ when a source of calcium comprising calcium carbonate is used, before moving on to the second step.

In the method of manufacture to make the porous support, in the second step, the suspension (B) of calcium phosphate porous support in general has a Ca/P molar ratio of at most 5, preferably of at most 3, more preferably still of at most 2.

In the method of manufacture to make the porous support, it is advantageous, in the second step, for the alkaline compound used, that comprises hydroxide ions, to be sodium hydroxide and/or calcium hydroxide.

In the method of manufacture to make the porous support, it is particularly advantageous for the additional source of calcium to be selected from the group consisting of calcium chloride, calcium nitrate, and calcium acetate, preferably calcium chloride, and for this additional source of calcium to be added to the alkaline compound, in order to finely adjust the Ca/P molar ratio and in order to limit the concentration of phosphorus element in the aqueous solution (C) of the suspension (B) to at most 5 mmol, advantageously to at most 0.5 mmol, more advantageously to at most 0.05 mmol of phosphorus element per liter of the aqueous solution (C). Specifically, this makes it possible, coupled with the use of hydroxide ions for setting the pH of the second step, to limit the losses of phosphates in the process water.

In the method of manufacture to make the support, in general, the stirring speed rate and the density of the suspension, in the second step and advantageously also in the first step, are adjusted in order to avoid the appearance of a calcium phosphate gel having a viscosity of at least 200 cps. The viscosity of the porous support suspension (B) in the second step of the process of the present invention is typically about 10 cps (mPa·s). Specifically, the production of a gel, even in the presence of the second step, results in making porous support particles of small particle size, with weight-mean D50 values of less than 10 µm, which may be a disadvantage for certain applications.

The suspended solids density of the suspension (A) in the first step is in general at most 20 wt %. The suspended solids density of the suspension (B) in the second step is in general at most 15 wt %. The suspended solids density of the suspension (A) and/or of the suspension (B) is advantageously at least 5 wt %, more advantageously at least 7 wt %, most advantageously at least 10 wt %. It has been indeed observed that a too low density of the suspension decreases the efficacy of the produced porous support particles in metal adsorption (in particular on Cu). Moreover a too low density of the suspension induces longer time of water separation when decantation or filtration is used in the method of making the support.

In the method of manufacture to make the support, the stirring speed of the suspension during the first and second steps corresponds generally to a stirring dissipated energy in the reactors volume of at least 0.2 kW/m$^3$ and at most 1.5 kW/m$^3$, preferably at least 0.5 kW/m$^3$ and at most 1.0 kW/m$^3$.

In a first embodiment of the method of manufacturing the support, the first step is carried out at a temperature of less than 50° C., preferably at most 45° C., or at most 40° C. This low-temperature first step makes it possible to obtain a calcium phosphate porous support at the end of the second step in the form of particles of large to medium particle size and having a high specific surface area. The method may manufacture in particular particles of porous support by this first embodiment, comprising at least 60% by weight of hydroxyapatite or hydroxyapatite-like structure, and having a mean size of at least 30 μm, preferably of at least 50 μm and having a specific BET surface area and/or pore volume as described above. In some embodiments, the specific BET surface area measured after heat treatment at 200° C. is at least 110 m$^2$/g. In some embodiments, the porous support may comprise at least 2 wt %, preferably at least 5 wt %, and more preferably at least 6 wt % of hydroxide ions.

In a second embodiment of the method for manufacturing the support, the first step is carried out at a temperature of at least 50° C., preferably of at least 55° C., or of at least 60° C. This makes it possible to obtain a porous support in the second step in the form of particles of small particle size and having a lower specific surface area. The process may manufacture in particular particles of porous support obtained by the method according to this second embodiment, comprising at least 60% by weight of hydroxyapatite, and having a mean size of at most 30 μm, preferably of at most 20 μm. In some embodiments, particles of porous support have a specific BET surface area of at least 15 m$^2$/g, preferably of at least 50 m$^2$/g, and having a content of hydroxide ions of greater than 2% by weight, preferably greater than 3.5% by weight, and more preferably greater than 4% by weight.

In the first or second embodiment of the method of manufacture, it is advantageous for the second step to be carried out at a temperature of at least 45° C., preferably of at least 55° C., or of at least 60° C., or of at least 80° C. Specifically, this makes it possible to rapidly convert the calcium phosphate compounds from the first step into the calcium phosphate porous support, with a good fixation of the hydroxide ions at the core and at the surface of the calcium phosphate porous support, and to more rapidly consume the phosphates from the solution of the suspension (B). Advantageously, the second step of the manufacture method is carried out at a temperature of at least 45° C., preferably of at least 55° C., or of at least 60° C., or of at least 80° C., for a time period of at least 0.1 to 0.5 hour. In general, the addition of the alkaline compound comprising hydroxide ions in order to set the pH of the second step, and of the additional source of calcium in order to obtain a suspension (B) of calcium phosphate porous support having a Ca/P molar ratio of greater than 1.6 last no more than 4 hours, advantageously no more than 2.5 hours: at higher temperature such as at 50° C. or at 60° C. generally one hour is sufficient, as at 40° C. the alkaline compound addition to set the pH of the second step is generally longer: and about 2.5 hours are needed. Preferably, the alkaline compound addition is stopped when the pH remains at the set value for at least 15 minutes. Advantageously, once the additions of hydroxide ions for setting the pH of the second step, and the addition of the additional source of calcium are completed, the suspension (B) is left to cool for 1 to 24 hours, preferably at least 10 hours, down to ambient temperature. This makes it possible to mature the calcium phosphate porous support and to reduce the residues of MCP/DCP or brushite, or of octacalcium (precipitated during the first step), into a hydroxyapatite structure and into calcium phosphate and calcium hydroxide complexes, within the suspension (B).

Optionally, in the manufacture method, at the end of the second step, the suspension (B) comprises an aqueous solution (C) and calcium phosphate porous support particles, and in a third step, a portion of the aqueous solution (C) is separated from the suspension (B) in order to obtain an aqueous suspension (D) comprising at least 18% and at most 50% of calcium phosphate porous support particles, or in order to obtain a wet solid (D') comprising at least 50% and at most 80% of calcium phosphate porous support particles, or a pulverulent solid (D") comprising at least 80% and at most 95% of calcium phosphate porous support particles and at least 5% and at most 20% of water.

In some embodiments, the porous support material is not isolated from the aqueous solution in which it is suspended prior to deposition of the active catalyst component.

In alternate embodiment, the porous support material may be isolated prior to deposition of the active catalyst component. Preferably in this instance, greater than 90% or 95% by weight of the solvent or dispersion medium is removed. More preferably, greater than 98% of the medium is removed. The isolation may comprise any type of solid/liquid separation; filtration is a preferred isolation technique.

In some embodiments, the porous support material may not be subjected to drying prior to deposition of the active catalyst component.

In alternate embodiment, the porous support material may be dried prior to deposition of the active catalyst component. Drying is preferably carried out after the porous support material has been isolated. When water is the dispersion medium, a suitable drying temperature is about 80° C. to about 120° C. However, it will be apparent to one of skill in the art that lower or higher drying temperatures may be used. For example, drying temperatures of less than 80° C. may be used if the drying time is increased or the drying pressure is decreased. A preferred drying temperature is from about 100° C. to about 120° C.

Copper-Containing Supported Catalyst

The calcium phosphate porous support obtained by the manufacture method described herein may be effective for use as a support for a catalyst for treating a waste gas contaminated by nitrogen oxides, in particular a flue gas contaminated by NOx and originating from a combustion process.

One or more embodiments of the present invention pertains to a catalyst supported on the calcium phosphate porous support as described previously.

A particular embodiment of the present invention pertains to a catalyst composition for catalytic reduction of $NO_x$ compounds, comprising an active catalyst component deposited on the porous support; wherein the active catalyst component comprises copper, copper oxide, or combination thereof.

The active catalyst component may comprise at least 0.1 wt %, preferably at least 0.5 wt %, more preferably at least 1.0 wt %, most preferably at least 1.5 wt %, of copper, copper oxide, or combination thereof; and/or may comprise at most 15 wt %, preferably at most at most 13 wt %, more preferably at most 12 wt %, most preferably at most 11 wt %, of copper, copper oxide, or combination thereof. A range of from 1.5 wt % to 11 wt % of Cu and/or CuO is particularly suitable. A range of from 3 wt % to 8 wt % of Cu and/or CuO is also particularly suitable.

In particular embodiments, the catalyst composition has a BET specific surface area measured after being calcined at 400° C. of at least 65 $m^2/g$ and/or at most 100 $m^2/g$.

In particular embodiments, the catalyst composition has a pore volume measured after being calcined at 400° C. of at least 0.3 $cm^3/g$, preferably of at least 0.41 $cm^3/g$, and/or at most 1.1 $cm^3/g$, preferably of at most 1.0 $cm^3/g$, more preferably of at most 0.9 $cm^3/g$. most preferably of at most 0.8 $cm^3/g$.

In particular embodiments, the catalyst composition has an average pore radius measured after being calcined at 400° C. of at least 5 nm, preferably at least 7 nm, and/or at most 30 nm, preferably at most 25 nm. The average pore radius is preferably determined from Gurvich rule: $rp = 2 (Vp/SBET) 10^3$, where Vp is the pore volume in $cm^3/g$, SBET is the BET surface area in $m^2/g$, and the pore radius is in nm.

In particular embodiments, the catalyst composition has a microporous and mesoporous morphology.

In some embodiments, the catalyst composition contains not more than 50%, preferably not more than 40%, of the copper species in the oxide form (CuO).

In alternate embodiments, the catalyst composition contains more than 50%, preferably more than 70%, of the copper species in the oxide form (CuO).

Method of Making the Copper-Containing Supported Catalyst

The active catalyst component may be deposited on the porous support using a solution of a copper precursor. A preferred copper precursor may be selected from the group consisting of copper nitrate ($CuNO_3$), copper acetate (Cu(Ac)), copper chloride ($CuCl_2$), copper acetylacetonate (Cu(Acac)), and any mixture thereof.

The active catalyst component may be deposited on the porous support by wet impregnation or ion-exchange, preferably by ion-exchange.

Wet impregnation (with small amount of excess water solution) is a catalyst preparation technique that does not require a copper precursor with ionic character. Therefore, also copper acetylacetonate besides copper acetate can be used as Cu precursor for the catalyst preparation via impregnation.

Impregnation is a technique in which a new phase is added on the external surface and in the pores of the porous support (if the pore dimensions allow the entrance of the used Cu precursor). In the case of the hydroxyapatite containing porous support, Cu besides Ca will be present in the final catalyst composition.

Ionic exchange (or ion-exchange or ion exchange, used interchangeably) is a technique for modifying the surface composition of materials that have metal cations bound to the framework with electrostatic bonds. This preparation technique necessitates a Cu precursor with ionic character. Therefore, copper acetate, copper chloride, and copper nitrate can be selected as copper precursor to provide $Cu^{2+}$ cations. Copper chloride and copper nitrate are particularly suitable as copper precursor with the ion exchange method.

The new cations are introduced in the sample composition and they substitute the original cations of the sample (in this case $Cu^{2+}$ cations substitute $Ca^{2+}$ cations of the hydroxyapatite which enter into solution). Ionic exchange is a method that exploits the electrostatic interaction between the added cations ($Cu^{2+}$) and the negative framework of the starting material (hydroxyapatite).

Concerning the possibility to load the support material with a given desired amount of the added metal, there are differences among the two preparation methods.

By impregnation, it is possible to load the support with a given amount of impregnating phase which has been chosen "a priori". The preparation technique does not employ any filtration or separation step of the impregnated support sample from the solution that contains the metal precursor of the loading phase. So, all the desired amount of metal precursor can effectively be loaded on the support.

By ion exchange, it is not possible to load the support exactly with a desired amount of any cation. Once the exchange reaction has finished, filtration has to be performed to separate the exchanged solid from the copper precursor solution that may contain some residual amount of the $Cu^{2+}$ cations.

After depositing the active catalyst component on the porous support, the particles may be washed to remove the non-exchanged or excess active component species. Washing medium may comprise water (such as deionized water) or a solvent similar to the one used to dissolve or disperse the copper precursor(s).

After the deposition of the active catalyst component on the porous support and the optional washing, the particles may be isolated by any suitable means, such as filtration, to remove the medium/solvent into which the copper precursor is dissolved or suspended or to remove the washing medium at the end of the washing step. Preferably, greater than 90% or 95% of the medium is removed. More preferably, greater than 98% of the medium is removed.

In some embodiments, after the deposition of the copper precursor onto the support, the (isolated) catalyst particles may be subjected to a heat treatment. The heat treatment may use a temperature from 105° C. to 500° C.

In some embodiments, after the deposition of the copper precursor onto the support, the resulting (isolated) catalyst particles may be subjected to a heat treatment (drying). The temperature at which the particles are dried is dependent on the solvent medium and the pressure which is used to dry the particles. Drying typically uses a temperature of 180° C. or less. Drying is typically carried out in air or in an $O_2$-containing atmosphere which may comprise another gaseous component such as nitrogen gas ($N_2$), helium or combination thereof. Drying may be carried out in a vacuum or not.

Typically, the same drying temperatures and times described above for drying the porous support will be useful for drying the supported catalyst after the active metal component has been deposited. The moisture level of the dried supported catalyst can be measured by standard methods known in the art to determine if the material has been dried for a sufficient amount of time at the particular temperature. When water is the medium into which the copper precursor is dissolved or suspended, a suitable drying temperature is about 80° C. to about 120° C. However, it will be apparent to one of skill in the art that lower or higher drying temperatures may be used. For example, drying temperatures of less than 80° C. may be used if the drying time is increased or the drying pressure is decreased. A preferred drying temperature is from about 100° C. to about 120° C. Usually, the catalyst is dried for at least 10 hours at 100-120° C. to ensure that the solvent is adequately removed. More typically, the catalyst may be dried for at least 12, 14 or 16 hours at 100-120° C. to ensure that the solvent is removed to a sufficient level.

In some embodiments, after the deposition of the copper precursor onto the support, the catalyst is subjected to a heat treatment (calcining) using a temperature more than 180° C. and up to 500° C. Preferably, calcining is performed after a drying step, but not necessarily.

In some embodiments, after the deposition of the copper precursor, the catalyst is not subjected to a heat treatment using a temperature greater than 180° C. (no calcination), prior to being used as a catalyst.

Alkali Sorbent

The alkali sorbent may comprise a sodium-containing compound or a Ca containing compound. A preferred alkali sorbent may comprise sodium bicarbonate, sodium carbonate, sodium sesquicarbonate (trona), quick lime, hydrated lime, limestone or any mixture thereof. The more preferred alkali sorbent may comprise sodium bicarbonate, sodium carbonate, sodium sesquicarbonate (trona), or any mixture thereof. The yet more preferred alkali sorbent may comprise sodium bicarbonate, sodium carbonate, sodium sesquicarbonate (trona), or any mixture thereof. The most preferred alkali sorbent may comprise or consist of sodium bicarbonate and/or sodium sesquicarbonate (trona).

The alkali sorbent may comprise a sodium-containing compound and in addition an ammonia source. For example the alkali sorbent may contain between 60% and 98%, preferably between 80 and 98%, by weight of sodium bicarbonate, but may additionally contain up to 2 wt %, preferably between 0.02% and 2.0% by weight of ammonia, expressed in the form of ammonium ions $NH_4^+$.

The sodium bicarbonate material described in WO2015/118165 and WO2015/118166 both from SOLVAY SA are suitable to be used in this process.

A suitable alkali sorbent in this process may include or consist of the reactive composition disclosed in WO2015/118165. This reactive composition comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, characterized in that the composition comprises less than 1.0%, preferably less than 0.9%, more preferably less than 0.8% by weight of water.

Another suitable alkali sorbent in this process may include or consist of the reactive composition disclosed in WO2015/118166. This reactive composition comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts, preferably fatty acids having 12 to 20 carbon atoms per molecule or a salt thereof.

The alkali sorbent is preferably in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Ammonia Source

The ammonia source may include urea, NH3, and/or an ammonium containing salt or solution (such as ammonium bicarbonate).

The ammonia source may be in the form of a gas (a gas comprising or consisting of $NH_3$), a liquid (e.g., solution of ammonium salt such as ammonium bicarbonate, solution of urea, solution of $NH_3$, or any mixtures thereof), or a solid (powder comprising an ammonium salt and/or urea).

The ammonia source may be included in the alkali sorbent and/or in the catalyst.

Blend of Supported Catalyst and Alkali Sorbent

Consequently, the present invention also relates to a blend comprising the supported deNOx catalyst and an alkali sorbent. This blend may be used for the multi-pollutant purification of a waste gas. In particular, this blend may be used for the removal of NOx and SOx through an injection of this blend into a waste gas stream contaminated by these pollutants.

The blend may comprise:
  at least 0.1 wt %, or at least 0.2 wt %, or at least 0.5 wt %, or at least 1 wt %, or at least 3 wt %, or at least 5 wt %, of the deNOx catalyst based on total weight of the blend, and/or
  at most 20 wt %, or at most 15 wt %, or at most 12 wt %, or at most 10 wt %, of the catalyst based on total weight of the blend.

The weight ratio of the deNOx catalyst to said alkaline sorbent in the blend may be at least 0.001, or at least 0.005, or at least 0.010, or at least 0.020, or at least 0.030, or at least 0.045. The weight ratio of the deNOx catalyst to said alkaline sorbent in the blend may be at most 1.00, or at most 0.50, or at most 0.40, or at most 0.30.

In some embodiments, the blend may further comprise an ammonia source. The ammonia source may include urea, an ammonium salt, and/or $NH_3$.

In some embodiments, the alkali sorbent in the blend may further contain an ammonia source. The ammonia source may include urea, an ammonium salt, and/or $NH_3$.

The preferred alkali sorbent in the blend may comprise a compound selected from the group consisting of trona, sodium bicarbonate, and mixture thereof.

In some embodiments, the alkali sorbent in the blend may comprise sodium bicarbonate and an ammonia source.

In some embodiments, the alkali sorbent in the blend may comprise at least 60 wt % sodium bicarbonate and from 0.02 wt % to 2 wt % of ammonia expressed in the form of ammonium ions $NH_4^+$.

In a particular embodiment, the alkali sorbent in the blend may comprise between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, characterized in that the alkali sorbent comprises less than 1.0%, preferably less than 0.9%, more preferably less than 0.8% by weight of water.

In a particular embodiment, the alkali sorbent in the blend may comprise between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts, preferably fatty acids having 12 to 20 carbon atoms per molecule or a salt thereof.

In some embodiments, the alkali sorbent in the blend is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

In some embodiments, the catalyst in the blend is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Purification Process for the Removal of Pollutants from Waste Gas

Consequently, the present invention also relates to the use of the supported catalyst and the alkali sorbent for the purification of a waste gas.

In particular, the supported deNOx catalyst and the alkali sorbent may be used for the removal of NOx and SOx by their injection into a waste gas stream contaminated by these pollutants.

The supported deNOx catalyst and the alkali sorbent may be injected together by first forming a blend and then injecting the blend, or by injecting the two materials at the same time and same location into the gas stream for effectively mixing them in situ.

A particular embodiment of the present invention relates to a purification process for the removal of pollutants, such as NOx, acid gas such as SOx ($SO_2$ & $SO_3$), HF, HCl, HBr, HI, H3PO4, and/or heavy metals like an element selected from the group consisting of: Al, Ag, As, Ba, Be, Bi, Ce, Co, Cd, Cu, Cr, Fe, Hf, Hg, La, Li, Mg, Mn, Mo, Ni, Pb, Pd, Rb, Sb, Se, Sn, Sr, Th, Ti, U, V, Y, Zn, Zr, from a combustion waste gas stream.

In a particular embodiment, the process comprises the steps:
- an ammonia source is injected into the combustion waste gas stream;
- the deNOx catalyst as described herein is brought into contact with the waste gas stream at a temperature of at least 100° C. and preferably at most 600° C. to carry out, in the presence of $O_2$, a reduction by $NH_3$ of at least a portion of the NOx, and
- the alkali sorbent is brought into contact with the same waste gas stream at a temperature of at least 100° C. and preferably at most 600° C. to remove at least a portion of the acid gas like SOx, HCl, and/or HF and/or at least a portion of the heavy metals.

In the process according to the invention, the catalyst particles are contacted with the waste gas stream for a sufficient time so that the catalyst converts by reduction by $NH_3$ at least a portion of the NOx.

In the process according to the invention, the alkali sorbent is contacted with the waste gas stream for a sufficient time so that the alkali sorbent adsorbs/reacts with at least a portion of the acid gas (HCl, HF, SOx).

The deNOx catalyst, the alkali sorbent, and the ammonium source used in the process has been described previously.

The deNOx catalyst and/or the alkali sorbent is preferably in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

The weight ratio of the deNOx catalyst to said alkaline sorbent brought into contact with the waste gas stream to be treated may be at least 0.001, or at least 0.005, or at least 0.010, or at least 0.020, or at least 0.030, or at least 0.045. The weight ratio of the deNOx catalyst to said alkaline sorbent brought into contact with the waste gas stream to be treated may be at most 1.00, or at most 0.50, or at most 0.40, or at most 0.30.

Preferably, the particulate catalyst (solid), the sorbent (solid) and the ammonia source (in liquid, gas or solid form) are injected in a duct/pipe/conduit through which the waste gas stream flows.

When the catalyst is dispersed into the waste gas to be treated, the catalyst may be injected into the waste gas stream in the form of a dry powder injection or a semi-dry injection of a slurry of the catalyst.

When the sorbent is dispersed into the waste gas to be treated, the sorbent may be injected into the waste gas stream in the form of a dry powder injection or a semi-dry injection of a slurry of the catalyst.

When the ammonia source is dispersed into the waste gas to be treated, the ammonia source may be injected into the waste gas stream in the form of a gas ($NH_3$ gas), in the form of a liquid (solution of ammonium bicarbonate and/or solution of urea, solution of ammonia, or combinations thereof), in the form of a powder (urea).

Alternatively or additionally, the ammonia source may be present in the catalyst composition or in the alkali sorbent.

In the process according to the invention, the waste gas stream may be a flue gas stream containing at least NOx and SOx.

The injection in the process may proceed as follows:
- an alkaline sorbent is injected in the flue gas stream,
- an ammonia source is injected in the flue gas stream downstream of the point of injection where the alkaline sorbent is injected;
- a particulate deNOx catalyst (as described herein) containing an hydroxyapatite is injected into the flue gas stream downstream of the point of injection where the alkaline sorbent and the ammonia source is injected.

The injection in the process may proceed as follows:
- an alkaline sorbent is injected in the flue gas stream,
- an ammonia source and a particulate deNOx catalyst (as described herein) are injected simultaneously in the flue gas stream downstream of the point of injection where the alkaline sorbent is injected.

The injection in the process may proceed as follows:
- an alkaline sorbent and the ammonia source are injected simultaneously injected in the flue gas stream,
- the particulate deNOx catalyst is injected separately in the flue gas stream downstream of the point of injection where the alkaline sorbent and the ammonia source are injected.

The injection in the process may proceed as follows:
the alkali sorbent, the ammonia source, and the deNOx catalyst are injected simultaneously into the flue gas stream.

The injection in the process may proceed as follows:
the ammonia source is injected into the flue gas stream;
the alkali sorbent and the particulate deNOx catalyst are injected simultaneously in the flue gas stream downstream of the point of injection where the ammonia source is injected.

If the catalyst and the sorbent both in solid form (powder) are dispersed into the waste gas stream to be treated, the resulting mixture is subjected to a gas/solid separation in order to produce a treated gas which is partially purified of NOx and SOx and solids comprising spent catalyst and sorbent in order for the solids to be removed from the treated gas. The separation preferably comprises a bag filter or an electrostatic precipitator (ESP), preferably a bag filter.

The supported catalyst and the sorbent may be dispersed in the flue gas stream, the flue gas stream being at a temperature of at least 100° C., or of at least 150° C., or of at least 180° C., or of at least 200° C.

The supported catalyst and the sorbent may be dispersed in the flue gas stream, the flue gas stream being at a temperature of at most 800° C., or of at most 600° C., of at most 550° C., or of at most 500° C., of at most 450° C., of at most 400° C., of at most 350° C., of at most 325° C., of at most 300° C.

When the catalyst and sorbent are injected as powder into a flue gas stream flowing through a flue duct, their use may be once-through—that is to say, the catalyst and sorbent are not used again. The contact time between the particles (catalyst and sorbent) and the waste gas stream to be treated may be very short in the order of millisecond(s) to seconds, such as at least one millisecond (ms), advantageously at least 5 ms, more advantageously at least 10 ms and/or at most 5 seconds, even more advantageously at most 4 seconds, yet even more advantageously at most 3 seconds.

The effectiveness of the treatment of NOx and SOx may be monitored by comparing the concentrations of NOx and SOx upstream (in the waste gas stream) and downstream of the treatment (in the partially treated gas stream), for example by an automatic analyser or by sampling and analysis.

Figure 10:
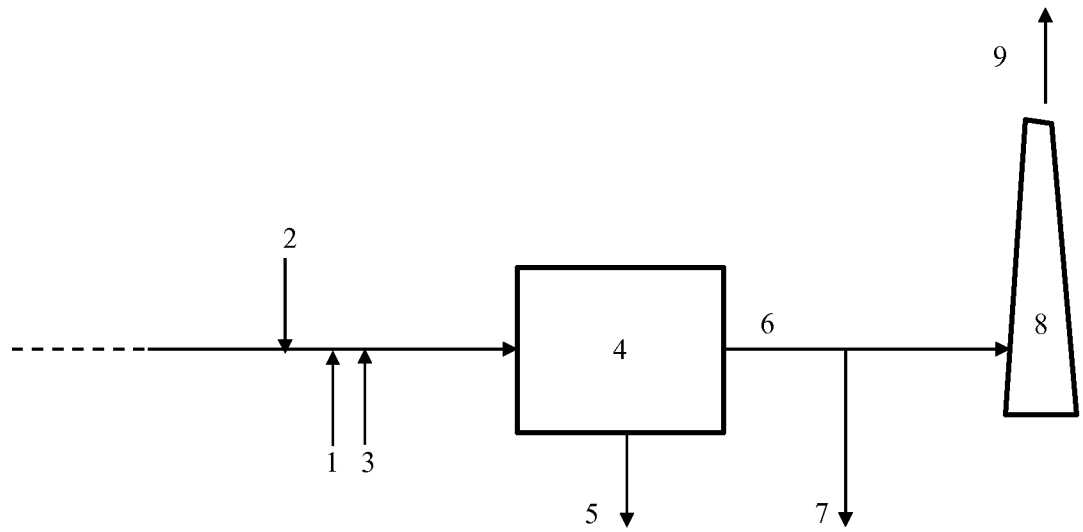
FIG. 10 is a schematic of a treatment process according to an embodiment of the present invention, wherein an ammonia source, an alkaline compound 2 and a particulate reactant containing apatite 3 are injected separately into a flue gas stream.

FIG. 10 is a schematic of a treatment process according to an embodiment of the present invention, in which a flue gas stream (dashed line in the figure) containing NOx and SOx and optionally heavy metals, is treated, and in which an alkali sorbent, an ammonia source, and a deNOx catalyst are injected separately into the flue gas. The process proceeds as follows:
an alkaline sorbent 2 is injected in the flue gas stream,
an ammonia source 1 is injected in the flue gas stream downstream of the point of injection where the alkaline sorbent 2 is injected;
a particulate deNOx catalyst 3 (as described herein) containing an hydroxyapatite is injected into the flue gas stream downstream of the point of injection where the alkaline sorbent 2 and the ammonia source 1 is injected;
the alkaline alkaline sorbent 2 and the particulate deNOx catalyst 3 with the presence of $O_2$ and $NH_3$ having removed at least part of the SOx, NOx, and optionally heavy metals are separated from the resulting gas stream in a solid particle separator 4 to obtain a residue 5 and a treated gas stream 6,
part of the gas stream 6 may be directed toward an analyzer 7 to measure the pollutants concentration in the treated gas stream 6 (and compared with the pollutants content of the flue gas stream before it is contacted with the sorbent, catalyst and $NH_3$ source) to check removal efficiency; and
the remaining treated gas stream 9 can be released in the atmosphere through a stack 8.

Figure 11:
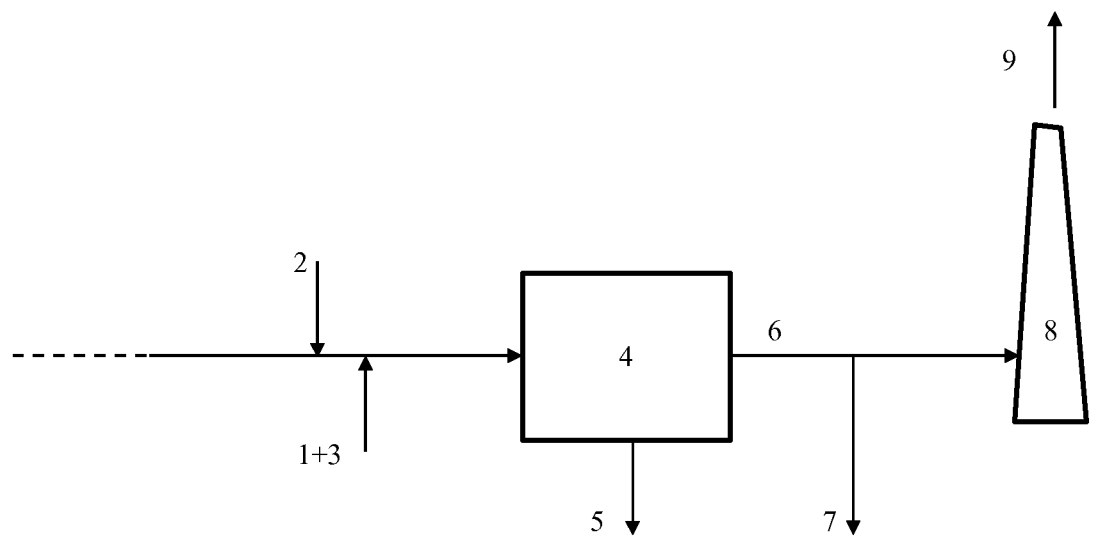
FIG. 11 is a schematic of a treatment process according to an embodiment of the present invention, wherein an ammonia source and a particulate catalyst 3 containing hydroxyapatite are injected together and an alkaline compound 2 is injected separately into a flue gas stream.

FIG. 11 is a schematic of a treatment process according to another embodiment of the present invention, in which a flue gas stream (dashed line in the figure) containing NOx and SOx and optionally heavy metals, is treated and an alkali sorbent is injected into the flue gas stream and separately the ammonia source and the deNOx catalyst are injected simultaneously downstream into the flue gas stream. The process proceeds as follows:
an alkaline sorbent 2 is injected in the flue gas stream,
an ammonia source 1 and a particulate deNOx catalyst 3 (as described herein) containing an hydroxyapatite are injected simultaneously in the flue gas stream downstream of the point of injection where the alkaline sorbent 2 is injected; and
the rest of the process downstream of these injections is the same as described for FIG. 10.

In this embodiment, the ammonia source may be injected at the same time and at the same location as the catalyst 3 is, but the $NH_3$ source and catalyst are not blended before they are injected.

In another embodiment, the $NH_3$ source and catalyst are blended before they are injected together into the flue gas.

Figure 12:
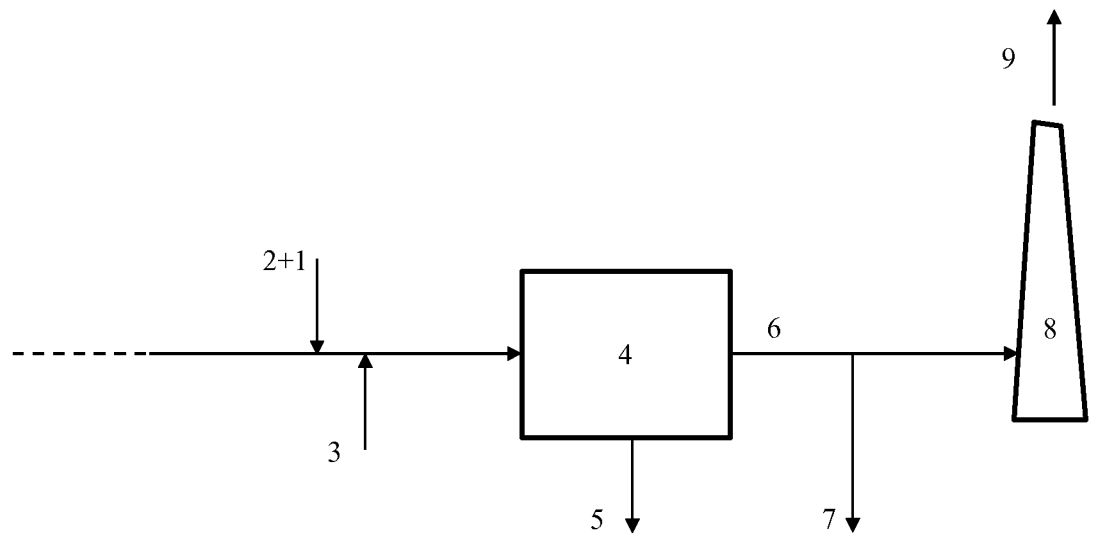
FIG. 12 is a schematic of a treatment process according to an embodiment of the present invention, wherein an ammonia source and an alkaline compound 2 are injected together and a particulate catalyst 3 containing hydroxyapatite is injected separately into a flue gas stream.

FIG. 12 is a schematic of a treatment process according to yet another embodiment of the present invention, in which a flue gas stream (dashed line in the figure) containing NOx and SOx and optionally heavy metals, is treated and an alkali sorbent and the ammonia source are injected simultaneously into the flue gas stream and separately the deNOx catalyst is injected downstream into the flue gas stream. The process proceeds as follows:
an alkaline sorbent 2 and the ammonia source 1 are injected simultaneously injected in the flue gas stream,
the particulate deNOx catalyst 3 (as described herein) containing an hydroxyapatite is injected separately in the flue gas stream downstream of the point of injection where the alkaline sorbent 2 and the ammonia source 1 are injected; and
the rest of the process downstream of these injections is the same as described for FIG. 10.

In this embodiment, the ammonia source may be injected at the same time and at the same location as the alkali sorbent is, but the $NH_3$ source and catalyst are not blended before they are injected.

In preferred embodiment, the $NH_3$ source and the alkali sorbent are blended before they are injected together into the flue gas.

In more preferred embodiment, the alkali sorbent is manufactured so that its composition includes a suitable $NH_3$ source.

Figure 13:
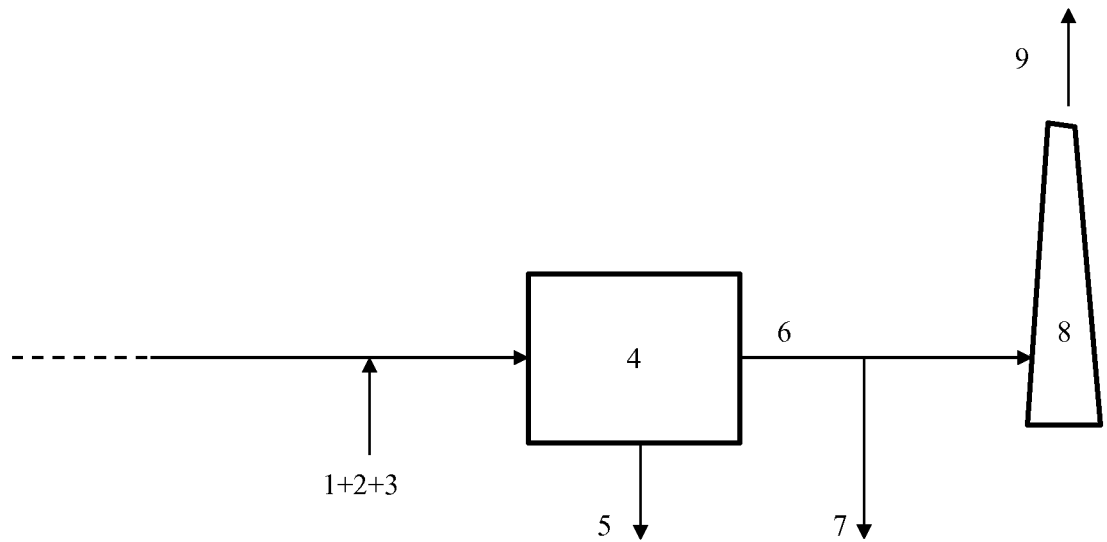
FIG. 13 is a schematic of a treatment process according to an embodiment of the present invention, wherein an ammonia source, an alkaline compound 2 and a particulate catalyst 3 containing hydroxyapatite are injected together into a flue gas stream.

FIG. 13 is a schematic of a treatment process according to a preferred embodiment of the present invention, in which a flue gas stream (dashed line in the figure) containing NOx and SOx and optionally heavy metals, is treated, and the alkali sorbent 2, the ammonia source 1, and the deNOx catalyst 3 are injected simultaneously into the flue gas stream and the rest of the process downstream of this injection is the same as described for FIG. 10.

In this embodiment, the ammonia source and the catalyst may be injected at the same time and at the same location as the alkali sorbent is, but the $NH_3$ source, the alkali sorbent and the catalyst are not blended together before they are injected at the same time and at the same location in a flue gas duct.

In preferred embodiment, the $NH_3$ source and the alkali sorbent are blended before they are injected together into the flue gas, and the deNOx catalyst is injected at the same time and at the same location where the blend is injected.

In more preferred embodiment, the alkali sorbent is manufactured so that its composition includes a suitable $NH_3$ source, and the deNOx catalyst is injected at the same time and at the same location where the $NH_3$ source-containing sorbent is injected.

In most preferred embodiment, the $NH_3$ source, the alkali sorbent and the catalyst are comprised in a blend, and this blend is injected into the flue gas stream.

Figure 14:
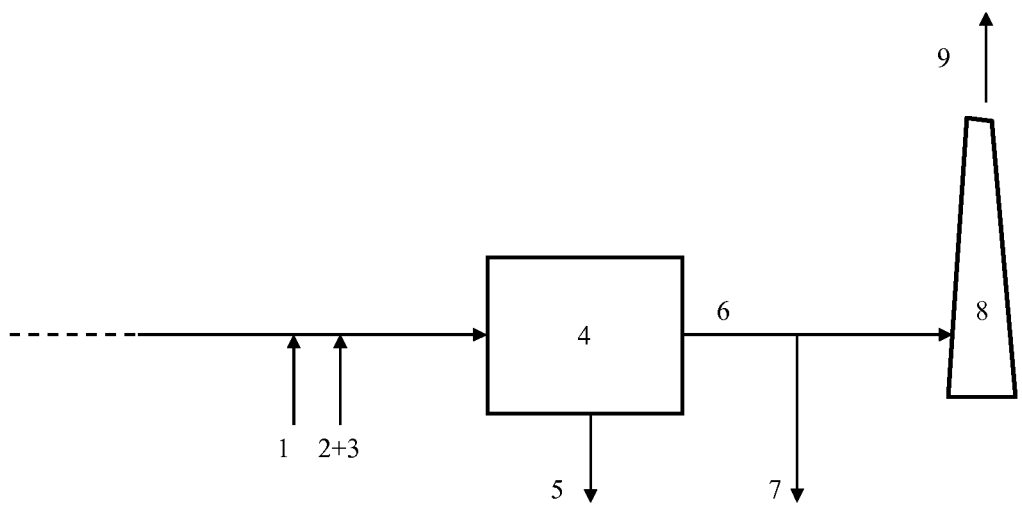
FIG. 14 is a schematic of a treatment process according to an embodiment of the present invention, wherein an alkaline compound 2 and a particulate catalyst 3 containing hydroxyapatite are injected together and an ammonia source is injected separately into a flue gas stream.

FIG. 14 is a schematic of a treatment process according to yet another preferred embodiment of the present invention, in which a flue gas stream (dashed line in the figure) containing NOx and SOx and optionally heavy metals, is treated and the alkali sorbent and the deNOx catalyst are injected simultaneously into the flue gas stream and separately the $NH_3$ source is injected upstream into the flue gas stream. The process proceeds as follows:

- the ammonia source 1 is injected into the flue gas stream;
- an alkaline sorbent 2 and the particulate deNOx catalyst 3 (as described herein) containing an hydroxyapatite are injected simultaneously in the flue gas stream downstream of the point of injection where the ammonia source 1 is injected; and
- the rest of the process downstream of these injections is the same as described for FIG. 10.

In this embodiment, the deNOx catalyst may be injected at the same time and at the same location as the alkali sorbent is, but the alkali sorbent and deNOx catalyst are not blended before they are injected.

In preferred embodiment, the deNOx catalyst and the alkali sorbent are blended before they are injected together into the flue gas.

In particular, the present invention relates to the following embodiments:

Item 1. Process for producing a calcium phosphate porous support, according to which:
- in a first step, use is made of a source of calcium and a source of phosphate ions in water, in a molar ratio that is adjusted so as to obtain a Ca/P molar ratio of between 0.5 and 1.6, and the source of calcium is reacted with the phosphate ions at a pH of between 2 and 8, in order to obtain a suspension (A) of calcium phosphate, and
- in a second step, added to the suspension (A) are an alkaline compound comprising hydroxide ions in order to set a pH of more than 8, preferably of more than 8.5, preferably of at least 9, or of at least 10, and an additional source of calcium in order to obtain a suspension (B) of calcium phosphate porous support having a Ca/P molar ratio of more than 1.6.

Item 2. Process according to the preceding item, in which in the second step the pH is set between 8 and 10.5, preferably between 8.5 and 10.

Item 3. Process according to any one of the preceding items, in which the source of calcium comprises calcium carbonate, or calcium oxide, or calcium hydroxide, or calcium chloride, or calcium nitrate, or calcium acetate.

Item 4. Process according to any one of the preceding items, in which the source of phosphate ions is phosphoric acid.

Item 5. Process according to any one of items 1 to 3, in which the source of phosphate ions is a dihydrogen phosphate salt such as a sodium, potassium or ammonium dihydrogen phosphate salt, preferably a sodium dihydrogen phosphate salt.

Item 6. Process according to any one of items 1 to 3, in which the source of phosphate ions is a monohydrogen phosphate salt such as a sodium, potassium or ammonium monohydrogen phosphate salt, preferably a sodium monohydrogen phosphate.

Item 7. Process according to any one of the preceding items, wherein in the second step, the suspension (B) of calcium phosphate porous support has a Ca/P molar ratio of at most 5, preferably of at most 3, more preferably still of at most 2.

Item 8. Process according to any one of the preceding items, in which, in the first step, the Ca/P molar ratio is:
- between 0.50 and 1.35, preferably between 0.70 to 1.30, or: between 1.4 and 1.6, preferably between 1.4 and 1.5.

Item 9. Process according to any one of the preceding items, wherein the source of calcium is in the form of powder or aqueous suspension of powder and the powder is selected from: calcium carbonate, calcium oxide, calcium hydroxide, or a mixture thereof, and the powder has a mean particle size of less than 300 µm.

Item 10. Process according to any one of the preceding items, in which the stirring speed and the density of suspension, in the second step and advantageously also in the first step, are adjusted in order to avoid the appearance of a calcium phosphate gel having a viscosity of at least 100 cps or at least 200 cps.

Item 11. Process according to any one of the preceding items, in which, in the second step, the alkaline compound used that comprises hydroxide ions is sodium hydroxide and/or calcium hydroxide and/or magnesium hydroxide.

Item 12. Process according to any one of the preceding items, in which, in the second step, the additional source of calcium is selected from calcium chloride, calcium nitrate, or calcium acetate, preferably calcium chloride, and is added in addition to the alkaline compound, in order to finely adjust the Ca/P molar ratio and limit the concentration of phosphorus element in the aqueous solution (C) of the suspension (B) to at most 5 mmol, advantageously to at most 0.5 mmol, more advantageously to at most 0.05 mmol of phosphorus element per litre of aqueous solution (C).

Item 13. Process according to any one of the preceding items, in which the first step is carried out at a temperature of less than 50° C., preferably of at most 45° C., more preferably of at most 40° C.

Item 14. Process according to any one of items 1 to 12, in which the first step is carried out at a temperature of at least 50° C., preferably of at least 55° C., more preferably of at least 60° C.

Item 15. Process according to any one of the preceding items, in which the second step is carried out at a temperature of at least 40° C., preferably of at least 45° C., more preferably of at least 55° C., even more preferably of at least 60° C., or of at least 80° C.

Item 16. Process according to any one of the preceding items wherein at the end of the second step, the suspension (B) comprises an aqueous solution (C) and calcium phosphate porous support particles, and
- in a third step, a portion of the aqueous solution (C) is separated from the suspension (B) in order to obtain an aqueous suspension (D) comprising at least 18% and at most 50% of calcium phosphate porous support particles, or to obtain a wet solid (D') comprising at least 50% and at most 80% of calcium phosphate porous support particles, or to obtain a pulverulent solid (D") comprising at least 80% and at most 95% of calcium phosphate porous support particles and at least 5% and at most 20% of water.

Item 17. Particles of calcium phosphate porous support obtainable by the process according to item 13, comprising at least 60% by weight of hydroxyapatite, and having a mean size of at least 30 μm.

Item 18. Particles of calcium phosphate porous support according to the preceding item comprising at least 70%, preferably at least 75%, more preferably at least 80% by weight of hydroxyapatite.

Item 19. Particles of calcium phosphate porous support according to Items 17 or 18 having a mean size of at least 50 μm.

Item 20. Particles of calcium phosphate porous support according to items 17 to 19 having a specific surface area of at least 50 m$^2$/g, more preferably of at least 110 m$^2$/g, even more preferably of at least 120 m$^2$/g, or of at least 140 m$^2$/g, or at least 160 m$^2$/g.

Item 21. Particles of calcium phosphate porous support according to Items 17 or 19 having a mean size of at most 200 μm, preferably of at most 100 μm, more preferably of at most 70 μm.

Item 22. Particles of calcium phosphate porous support according to items 17 to 21 comprising at least 2%, preferably at least 5%, and more preferably at least 6% by weight of hydroxide ions.

Item 23. Particles of calcium phosphate porous support according to items 17 to 22 covered with plate-like crystallites, and wherein the plate-like crystallites have a thickness of at most 25 nm, preferably of at most 20 nm, more preferably of at most 10 nm.

Item 24. Particles of calcium phosphate porous support according to item 23 wherein the thickness of plate-like crystallites is at least 1 nm, preferably at least 2 nm, more preferably at least 4 nm.

Item 25. Particles of calcium phosphate porous support according to Items 17 to 24 and having a mean size of at least 50 μm.

Item 26. Particles of calcium phosphate porous support according to Items 17 to 25 wherein the solubilized phosphate of 10 g of such particles stirred in 90 mL of water during 24 hours with a lab magnetic barrel, then filtrated on a 0.45 μm nitrocellulose membrane, is less than 10 mg PO$_4$/L of water.

Item 27. Aqueous suspension (D) comprising at least 25% and at most 50% by weight of calcium phosphate porous support particles according to item 17 to 26, preferably obtainable from the process of item 16.

Item 28. A pulverulent solid (D") comprising at least 80 wt % and at most 95 wt % of the calcium phosphate porous support particles according to item 17 to 26 and comprising at least 5 wt %, preferably at least 6 wt %, more preferably at least 10 wt %, even more preferably at least 15 wt % of water, advantageously obtainable from the process of item 16.

Item 29. A pulverulent solid (D") according to item 28 comprising at most 20 wt % of water.

Item 30. Particles of calcium phosphate porous support obtainable by the process according to item 14, comprising at least 60% by weight of hydroxyapatite, and having a mean size of at most 30 μm, preferably of at most 20 μm and having a specific surface area of at least 15 m$^2$/g, preferably of at least 50 m$^2$/g, and having a content of hydroxide ions of greater than 2% by weight, preferably greater than 3.5% by weight, and more preferably greater than 4% by weight.

Item 31. A porous support comprises at least 60 wt % of a calcium-deficient hydroxyapatite having a calcium to phosphate molar ratio (Ca/P) of less than 1.67, preferably more than 1.5 and less than 1.67; the porous support having a specific BET surface area measured after heat treatment at 120° C. of at least 110 m$^2$/g and a pore volume measured after heat treatment at 120° C. of at least 0.41 cm$^3$/g; or having a specific BET surface area measured after heat treatment at 200° C. of at least 110 m$^2$/g and a pore volume measured after heat treatment at 200° C. of at least 0.5 cm$^3$/g.

Item 32. The porous support according to Item 31 further comprising calcium carbonate in an amount of less than 20 wt % and more than 0 wt %, preferably from 1 wt % to 19 wt %, more preferably from 2 wt % to 18 wt %, even more preferably from 5 wt % to 15 wt %, yet even more preferably from 7 wt % to 13 wt %, most preferably from 8 wt % to 12 wt %.

Item 33. The porous support according to Item 31 or 32, comprising less than 1 wt % of calcium dihydroxide Ca(OH)$_2$, preferably less than 0.5 wt % calcium dihydroxide Ca(OH)$_2$, more preferably less than 0.3 wt % calcium dihydroxide Ca(OH)$_2$, even more preferably less than 0.2 wt % calcium dihydroxide Ca(OH)$_2$, most preferably being substantially free of calcium dihydroxide Ca(OH)$_2$.

Item 34. The porous support according to any of the items 31 to 33, further comprising water in an amount of less than 20 wt % and more than 0 wt %, preferably from 1 wt % to 18 wt %, more preferably from 2 wt % to 15 wt %, even more preferably from 4 wt % to 12 wt %, yet even more preferably from 5 wt % to 11 wt % most preferably from 6 wt % to 11 wt %.

Item 35. The porous support according to any of the Items 31 to 34, comprising a Ca/P molar ratio of 1.60 or more, preferably of 1.65 or more, preferably of 1.67 or more, more preferably of 1.68 or more.

Item 36. The porous support according to any of the Items 31 to 35, comprising a Ca/P molar ratio greater than the Ca/P molar ratio of the calcium-deficient hydroxyapatite.

Item 37. The porous support according to any of the Items 31 to 36, comprising at least 65 wt %, preferably at least 70 wt %, more preferably at least 75 wt %, yet more preferably at least 80 wt %, yet most preferably at least 85 wt %, of the calcium-deficient hydroxyapatite, Item 38. The porous support according to any of the Items 31 to 37, comprising at most 99 wt %, preferably at most 98 wt %, more preferably at most 97 wt %, yet more preferably at most 95 wt %, even more preferably at most 93 wt %, most preferably at most 91 wt % of the calcium-deficient hydroxyapatite.

Item 39. The porous support according to any of the Items 31 to 38, having a BET specific surface area measured after heat treatment at 200° C. of at least 120 m$^2$/g and/or at most 160 m$^2$/g.

Item 40. The porous support according to any of the Items 31 to 39, having a BET specific surface area measured after heat treatment at 400° C. of at least 60 m$^2$/g and/or at most 100 m$^2$/g.

Item 41. The porous support according to any of the Items 31 to 40, having a BET specific surface area measured after heat treatment at 600° C. of at least 20 m$^2$/g and/or at most 40 m$^2$/g.

Item 42. The porous support according to any of the Items 31 to 41, having a pore volume measured after heat treatment at 200° C. of at least 0.55 cm$^3$/g, preferably of at least 0.55 cm$^3$/g and/or at most 1.0 cm$^3$/g, preferably of at most 0.95 cm$^3$/g.

Item 43. The porous support according to any of the Items 31 to 42, having a pore volume measured after heat treatment at 400° C. of at least 0.50 cm$^3$/g, preferably of at least 0.60 cm$^3$/g and/or at most 1 cm$^3$/g.

Item 44. The porous support according to any of the Items 31 to 43, having a pore volume measured after heat treatment at 600° C. of at least 0.42 cm$^3$/g, preferably of at least 0.44 cm$^3$/g and/or at most 0.8 cm$^3$/g, preferably of at most 0.75 cm$^3$/g.

Item 45. A catalyst composition for catalytic reduction of NO$_x$ compounds, comprising an active catalyst component deposited on the porous support of any of the Items 31 to 44, wherein said active catalyst component comprises copper, copper oxide, or combination thereof.

Item 46. The catalyst composition for catalytic reduction of NO$_x$ compounds according to any of the preceding Item 45, according to which the active catalyst component comprises
at least 0.1 wt %, preferably at least 0.5 wt %, more preferably at least 1.0 wt %, most preferably at least 1.5 wt %, of copper, copper oxide, or combination thereof; and/or
at most 15 wt %, preferably at most, more preferably at most 13 wt %, yet more preferably at most 12 wt %, most preferably at most 11 wt %, of copper, copper oxide, or combination thereof.

Item 47. The catalyst composition for catalytic reduction of NO$_x$ compounds according to any of the Items 45-46, according to which the active catalyst component is deposited on the porous support by ion exchange.

Item 48. The catalyst composition for catalytic reduction of NO$_x$ compounds according to any of the Items 45-47, according to which the active catalyst component is deposited on the porous support using a copper precursor selected from the group consisting of copper nitrate, copper acetate, copper chloride, copper acetylacetonate, and any mixture thereof.

Item 49. The catalyst composition for catalytic reduction of NO$_x$ compounds according to any of the Items 45-48, which is subjected to a heat treatment using a temperature from 105° C. up to 500° C., prior to being used as a catalyst.

Item 50. The catalyst composition for catalytic reduction of NO$_x$ compounds according to any of the Items 45-49, which is not subjected to a heat treatment using a temperature greater than 200° C., prior to being used as a catalyst for catalytic reduction of NO$_x$ compounds.

Item 51. The catalyst composition for catalytic reduction of NO$_x$ compounds according to any of the Items 45-50, in which the catalyst composition has a BET specific surface area measured after being calcined at 400° C. of at least 65 m$^2$/g and/or at most 100 m$^2$/g.

Item 52. The catalyst composition for catalytic reduction of NO$_x$ compounds according to any of the Items 45-51, in which the catalyst composition has a pore volume measured after being calcined at 400° C. of:
at least 0.3 cm$^3$/g, preferably of at least 0.41 cm$^3$/g, and/or
at most 1.1 cm$^3$/g, preferably of at most 1.0 cm$^3$/g, more preferably of at most 0.9 cm$^3$/g. most preferably of at most 0.8 cm$^3$/g.

Item 53. The catalyst composition for catalytic reduction of NO$_x$ compounds according to any of the Items 45-52, having a microporous and mesoporous morphology.

Item 54. The catalyst composition for catalytic reduction of NO$_x$ compounds according to any of the Items 45-53, in which the catalyst composition has an average pore radius measured after being calcined at 400° C. of at least 5 nm, or at least 7 nm, and/or at most 30 nm, or at most 25 nm, preferably wherein the average pore radius is determined from Gurvitch rule: rp=2 (Vp/SBET) 10$^3$, where Vp is the pore volume in cm$^3$/g, SBET is the BET surface area in m$^2$/g, and the pore radius is in nm.

Item 55. A catalyst composition for catalytic reduction of NO$_x$ compounds, comprising an active catalyst component deposited on the particles of the calcium phosphate porous support according to any of the Items 17 to 26 or Item 30, or of the pulverulent solid (D") according to Item 28 or 29, wherein the active catalyst component comprises copper, copper oxide, or combination thereof.

Item 56. Process for treating a waste gas stream containing nitrogen oxides (NOx), said gas stream originating from a combustion process, in which an ammonia source is injected into the waste gas stream; and in which the catalyst composition according to any of the Items 45-54 is brought into contact with the waste gas stream containing ammonia at a temperature of at least 100° C. and preferably at most 600° C. to carry out, in the presence of O$_2$, a reduction by NH$_3$ of at least a portion of the NOx to N$_2$ and water.

Item 57. Process according to item 56 in which the waste gas stream temperature is:
at least 105° C., or at least 120° C., or at least 150° C., or at least 180° C., or at least 200° C.; and/or
at most 550° C., or at most 500° C., or at most 450° C., or at most 400° C., or at most 350° C., or at most 325° C., or at most 300° C.

Item 58. Process according to Item 54 or 55 in which the catalyst composition is injected into the waste gas stream in the form of a dry powder injection or a semi-dry injection of a slurry of the catalyst.

Item 59. Process for treating a waste gas stream containing nitrogen oxides (NOx) and contaminants selected from the group consisting of heavy metals, acid gases (such as SO$_2$, SO$_3$, HCl, and/or HF) and combinations thereof, said waste gas stream originating from a combustion process, said treating process comprising:
injecting an alkali sorbent into the waste gas stream, said alkali sorbent comprising a compound selected from the group consisting of sodium bicarbonate, sodium carbonate, sodium sesquicarbonate (trona), quick lime, hydrated lime, limestone, and combinations thereof;
contacting at least a portion of the contaminants with the alkali sorbent to remove at least a portion of the contaminants from the waster gas stream,
injecting an ammonia source into the waste gas stream;
injecting a catalyst into the waste gas stream; and
converting, in the presence of O$_2$, by reduction with NH$_3$ of at least a portion of the NOx in the waste gas stream to N2 and water at a temperature of at least 100° C. and preferably at most 600° C.,
the catalyst comprises an active catalyst component deposited on a porous support;
wherein said active catalyst component comprises copper, copper oxide, or combination thereof; and
wherein said porous support comprises at least 60 wt % of a calcium-deficient hydroxyapatite having a calcium to phosphate molar ratio (Ca/P) of less than 1.67, preferably more than 1.5 and less than 1.67.

Item 60. Process according to Item 59 wherein the porous support of the catalyst further comprises calcium carbonate in an amount of less than 20 wt % and more than 0 wt %, preferably from 1 wt % to 19 wt %, more preferably from 2 wt % to 18 wt %, even more preferably from 5 wt % to 15 wt %, yet even more preferably from 7 wt % to 13 wt %, most preferably from 8 wt % to 12 wt %.

Item 61. Process according to Item 59 or 60, wherein the porous support of the catalyst comprises less than 1 wt % of calcium dihydroxide $Ca(OH)_2$, preferably less than 0.5 wt % calcium dihydroxide $Ca(OH)_2$, more preferably less than 0.3 wt % calcium dihydroxide $Ca(OH)_2$, even more preferably less than 0.2 wt % calcium dihydroxide $Ca(OH)_2$, most preferably being substantially free of calcium dihydroxide $Ca(OH)_2$.

Item 62. Process according to any of Items 59-61, wherein the porous support of the catalyst further comprises water in an amount of less than 20 wt % and more than 0 wt %, preferably from 1 wt % to 18 wt %, more preferably from 2 wt % to 15 wt %, even more preferably from 4 wt % to 12 wt %, yet even more preferably from 5 wt % to 11 wt % most preferably from 6 wt % to 11 wt %.

Item 63. Process according to any of Items 57-60, wherein the porous support of the catalyst comprises a Ca/P molar ratio greater than the Ca/P molar ratio of the calcium-deficient hydroxyapatite.

Item 64. Process according to any of Items 57-61, wherein the porous support of the catalyst comprises a Ca/P molar ratio of 1.60 or more, preferably of 1.65 or more, preferably of 1.67 or more, more preferably of 1.68 or more.

Item 65. Process according to any of Items 59-64, wherein the porous support of the catalyst comprises:
  at least 65 wt %, preferably at least 70 wt %, more preferably at least 75 wt %, yet more preferably at least 80 wt %, yet most preferably at least 85 wt %, of the calcium-deficient hydroxyapatite,
  and/or comprises
  at most 99 wt %, preferably at most 98 wt %, more preferably at most 97 wt %, yet more preferably at most 95 wt %, even more preferably at most 93 wt %, most preferably at most 91 wt % of the calcium-deficient hydroxyapatite.

Item 66. Process according to any of Items 59-65, wherein the porous support has a specific BET surface area of at least 110 $m^2/g$ and a pore volume of at least 0.5 $cm^3/g$ after a heat treatment at 200° C.

Item 67. Process according to any of Items 59-66, wherein the catalyst has a BET specific surface area measured after being calcined at 400° C. of at least 65 $m^2/g$ and/or at most 100 $m^2/g$.

Item 68. Process according to any of Items 59-67, wherein the catalyst has a pore volume measured after being calcined at 400° C. of:
  at least 0.3 $cm^3/g$, preferably of at least 0.41 $cm^3/g$, and/or
  at most 1.1 $cm^3/g$, preferably of at most 1.0 $cm^3/g$, more preferably of at most 0.9 $cm^3/g$. most preferably of at most 0.8 $cm^3/g$.

Item 69. Process according to any of Items 59-68, wherein the active catalyst component comprises:
  at least 0.1 wt %, preferably at least 0.5 wt %, more preferably at least 1.0 wt %, most preferably at least 1.5 wt %, of copper, copper oxide, or combination thereof; and/or
  at most 15 wt %, preferably at most, more preferably at most 13 wt %, yet more preferably at most 12 wt %, most preferably at most 11 wt %, of copper, copper oxide, or combination thereof.

Item 70. Process according to any of Items 59-69, wherein the active catalyst component is deposited on the porous support by ion exchange or impregnation using a copper precursor selected from the group consisting of copper nitrate, copper acetate, copper chloride, copper acetylacetonate, and any mixture thereof.

Item 71. Process according to any of Items 59-70, wherein the alkali sorbent comprises or consists of a compound selected from the group consisting of trona, sodium bicarbonate, and mixture thereof.

Item 72. Process according to any of Items 59-71, wherein the alkali sorbent contains an ammonia source.

Item 73. Process according to any of Items 59-72, wherein the weight ratio of the catalyst to said alkali sorbent is
  at least 0.001, or at least 0.005, or at least 0.010, or at least 0.020, or at least 0.030, or at least 0.045; and/or
  at most 1.00, or at most 0.50, or at most 0.40, or at most 0.30.

Item 74. Process according to any of Items 59-73, wherein the alkali sorbent and the catalyst are mixed to form a blend to be injected together into the waste gas stream.

Item 75. Process according to Item 74, wherein the blend comprises
  at least 0.1 wt %, or at least 0.2 wt %, or at least 0.5 wt %, or at least 1 wt %, or at least 3 wt %, or at least 5 wt %, of the catalyst, and/or
  at most 20 wt %, or at most 15 wt %, or at most 12 wt %, or at most 10 wt %, of the catalyst.

Item 76. Process according to any of Items 59-75, wherein the alkali sorbent and the catalyst are injected sequentially into the waste gas stream flowing through a duct, and wherein the alkali sorbent is injected in a duct at a location upstream of where the catalyst is injected.

Item 77. Process according to any of Items 59-76, wherein the ammonia source and the catalyst are injected simultaneously into the waste gas stream.

Item 78. Process according to any of Items 59-77, wherein the temperature is at least 105° C. and at most 500° C., preferably at least 120° C. and at most 400° C., more preferably at least 120° C. and at most 350° C., more preferably at least 180° C. and at most 300° C.

Item 79. Process according to any of Items 59-76, wherein the alkali sorbent is selected from the group consisting of trona, sodium bicarbonate, and mixture thereof.

Item 80. Process according to any of Items 59-79, wherein the alkali sorbent contains an ammonia source.

Item 81. Process according to any of Items 59-80, wherein the weight ratio of the catalyst to said alkali sorbent is
  at least 0.001, or at least 0.005, or at least 0.010, or at least 0.020, or at least 0.030, or at least 0.045; and/or
  at most 1.00, or at most 0.50, or at most 0.40, or at most 0.30.

Item 82. Process according to any of Items 59-81, wherein the catalyst further comprises an ammonia source.

Item 83. Process according to any of Items 59-82, wherein the alkali sorbent further comprises an ammonia source.

Item 84. Process according to Item 83, wherein the alkali sorbent comprises sodium bicarbonate and an ammonia source.

Item 85. Process according to any of Items 59-84, wherein the ammonia source is urea, an ammonium salt, and/or $NH_3$.

Item 86. Process according to Item 84, wherein the alkali sorbent comprises at least 60 wt % sodium bicarbonate and from 0.02 wt % to 2 wt % of ammonia expressed in the form of ammonium ions $NH_4^+$.

Item 87. Process according to Item 86, wherein the alkali sorbent comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, characterized in that the alkali sorbent comprises less than 1.0%, preferably less than 0.9%, more preferably less than 0.8% by weight of water.

Item 88. Process according to Item 86, wherein the alkali sorbent comprises comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts, preferably fatty acids having 12 to 20 carbon atoms per molecule or a salt thereof.

Item 89. Process according to any of Items 59-88, wherein the alkali sorbent is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Item 90. Process according to any of Items 59-89, wherein the catalyst is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Item 91. A blend comprising an alkali sorbent and a catalyst,
said alkali sorbent being selected from the group consisting of limestone, lime, trona, sodium bicarbonate, and combinations thereof,
said catalyst comprising an active catalyst component deposited on a porous support; wherein said active catalyst component comprises copper, copper oxide, or combination thereof;
wherein said porous support comprises at least 60 wt % of a calcium-deficient hydroxyapatite having a calcium to phosphate molar ratio (Ca/P) of less than 1.67, preferably more than 1.5 and less than 1.67.

Item 92. Blend according to Item 91, comprising
at least 0.1 wt %, or at least 0.2 wt %, or at least 0.5 wt %, or at least 1 wt %, or at least 3 wt %, or at least 5 wt %, of the catalyst, and/or
at most 20 wt %, or at most 15 wt %, or at most 12 wt %, or at most 10 wt %, of the catalyst;

Item 93. Blend according to Item 91 or 92, wherein the porous support of the catalyst further comprises calcium carbonate in an amount of less than 20 wt % and more than 0 wt %, preferably from 1 wt % to 19 wt %, more preferably from 2 wt % to 18 wt %, even more preferably from 5 wt % to 15 wt %, yet even more preferably from 7 wt % to 13 wt %, most preferably from 8 wt % to 12 wt %.

Item 94. Blend according to any of Items 91-92, wherein the porous support of the catalyst comprises less than 1 wt % of calcium dihydroxide $Ca(OH)_2$, preferably less than 0.5 wt % calcium dihydroxide $Ca(OH)_2$, more preferably less than 0.3 wt % calcium dihydroxide $Ca(OH)_2$, even more preferably less than 0.2 wt % calcium dihydroxide $Ca(OH)_2$, most preferably being substantially free of calcium dihydroxide $Ca(OH)_2$.

Item 95. Blend according to any of Items 91-93, wherein the porous support of the catalyst further comprises water in an amount of less than 20 wt % and more than 0 wt %, preferably from 1 wt % to 18 wt %, more preferably from 2 wt % to 15 wt %, even more preferably from 4 wt % to 12 wt %, yet even more preferably from 5 wt % to 11 wt % most preferably from 6 wt % to 11 wt %.

Item 96. Blend according to any of Items 91-94, wherein the porous support of the catalyst comprises a Ca/P molar ratio greater than the Ca/P molar ratio of the calcium-deficient hydroxyapatite.

Item 97. Blend according to any of Items 91-96, wherein the porous support of the catalyst comprises a Ca/P molar ratio of 1.60 or more, preferably of 1.65 or more, preferably of 1.67 or more, more preferably of 1.68 or more.

Item 98. Blend according to any of Items 91-97, wherein the porous support of the catalyst comprises:
at least 65 wt %, preferably at least 70 wt %, more preferably at least 75 wt %, yet more preferably at least 80 wt %, yet most preferably at least 85 wt %, of the calcium-deficient hydroxyapatite,
and/or comprises
at most 99 wt %, preferably at most 98 wt %, more preferably at most 97 wt %, yet more preferably at most 95 wt %, even more preferably at most 93 wt %, most preferably at most 91 wt % of the calcium-deficient hydroxyapatite.

Item 99. Blend according to any of Items 91-98, wherein the porous support has a specific BET surface area of at least 110 m$^2$/g and a pore volume of at least 0.5 cm$^3$/g after a heat treatment at 200° C.

Item 100. Blend according to any of Items 91-99, wherein the catalyst has a BET specific surface area measured after being calcined at 400° C. of at least 65 m$^2$/g and/or at most 100 m$^2$/g.

Item 101. Blend according to any of Items 91-100, wherein the catalyst has a pore volume measured after being calcined at 400° C. of:
at least 0.3 cm$^3$/g, preferably of at least 0.41 cm$^3$/g, and/or
at most 1.1 cm$^3$/g, preferably of at most 1.0 cm$^3$/g, more preferably of at most 0.9 cm$^3$/g. most preferably of at most 0.8 cm$^3$/g.

Item 102. Blend according to any of Items 91-101, wherein the active catalyst component comprises:
at least 0.1 wt %, preferably at least 0.5 wt %, more preferably at least 1.0 wt %, most preferably at least 1.5 wt %, of copper, copper oxide, or combination thereof;
and/or
at most 15 wt %, preferably at most, more preferably at most 13 wt %, yet more preferably at most 12 wt %, most preferably at most 11 wt %, of copper, copper oxide, or combination thereof.

Item 103. Blend according to any of Items 91-102, wherein the active catalyst component is deposited on the porous support by ion exchange or impregnation using a copper precursor selected from the group consisting of copper nitrate, copper acetate, copper chloride, copper acetylacetonate, and any mixture thereof.

Item 104. Blend according to any of Items 91-103, wherein the alkali sorbent comprises a compound selected from the group consisting of trona, sodium bicarbonate, and mixture thereof.

Item 105. Blend according to any of Items 91-103, wherein the alkali sorbent contains an ammonia source.

Item 106. Blend according to any of Items 91-105, wherein the weight ratio of the catalyst to said alkali sorbent is
at least 0.001, or at least 0.005, or at least 0.010, or at least 0.020, or at least 0.030, or at least 0.045; and/or
at most 1.00, or at most 0.50, or at most 0.40, or at most 0.30.

Item 107. Blend according to any of Items 91-105, further comprising an ammonia source.

Item 108. Blend according to Item 106, wherein the ammonia source is urea, an ammonium salt, and/or $NH_3$.

Item 109. Blend according to Item 106 or 107, wherein the alkali sorbent comprises sodium bicarbonate and an ammonia source.

Item 110. Blend according to any of Items 106-109, wherein the alkali sorbent comprises at least 60 wt % sodium bicarbonate and from 0.02 wt % to 2 wt % of ammonia expressed in the form of ammonium ions $NH_4^+$.

Item 111. Blend according to any of Items 106-110, wherein the alkali sorbent comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, characterized in that the alkali sorbent comprises less than 1.0%, preferably less than 0.9%, more preferably less than 0.8% by weight of water.

Item 112. Blend according to any of Items 106-111, wherein the alkali sorbent comprises comprises between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts, preferably fatty acids having 12 to 20 carbon atoms per molecule or a salt thereof.

Item 113. Blend according to any of Items 106-112, wherein the alkali sorbent is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Item 114. Blend according to any of Items 106-113, wherein the catalyst is in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 µm, measured by laser diffractometry.

Item 115. Process for treating a waste gas stream containing nitrogen oxides (NOx) and contaminants selected from the group consisting of heavy metals, acid gases (such as $SO_2$, $SO_3$, $H_3PO_4$, HCl, HI, HBr, and/or HF) and combinations thereof, said waste gas stream originating from a combustion process, said treating process comprising:
 injecting the blend according to any of Items 89-110 into the waste gas stream;
 removing at least a portion of the contaminants from the waste gas stream with the alkali sorbent,
 converting, in the presence of $O_2$, by reduction with $NH_3$ of at least a portion of the NOx in the waste gas stream to $N_2$ and water at a temperature of at least 100° C. and preferably at most 600° C.

Item 116. The process according to Item 115, wherein the temperature is
 at least 105° C. and at most 500° C., preferably at least 120° C., most preferably at least 180° C.; and/or
 at most 400° C., more preferably at most 120° C.; or at most 350° C., most preferably at most 300° C.

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Accordingly, the scope of protection is not limited by the description and Examples set out above, but is only limited by the claims which follow, that scope including all equivalents of the subject matter of the claims.

The present invention having been generally described, the following Examples are given as particular embodiments of the invention and to demonstrate the practice and advantages thereof. It is understood that the examples are given by way of illustration and are not intended to limit the specification or the claims to follow in any manner.

EXAMPLES

Example 1—Preparation of Catalyst Support

In this example, three calcium phosphate (Ca/P) supports labelled S12, S14, S16 were made under similar conditions as those described in example 1 (particularly in examples 1b and 1c) of WO2015/173437 patent application. The differences in conditions are explained below. After synthesis, the support samples were filtered and these wet samples were subjected to several analysis.

The calcium phosphate (Ca/P) support S12 was prepared in similar conditions as the ones of example 1b of WO2015/173437. Limestone was dispersed in water at 20-25° C. in a baffled 200-liter reactor. For the first step, $H_3PO_4$ (75%) was then added to this suspension and the mixture was stirred at 390 rpm using a double 4-blade impeller. At the end of the addition of acid, the mixture was heated up to about 50° C., and a 25 wt % suspension of $Ca(OH)_2$ was added to maintain the pH of the suspension at 8-8.8 for the second step. The reaction time was 140 minutes. After the reaction time, the suspension is continually stirred at half the stirring speed than was used in the first step to allow it to cool down to 20-25° C. The final density of solid suspension in aqueous suspension (B) was 18% by weight (solid weight reported to total weight of the aqueous suspension).

The calcium phosphate (Ca/P) support S14 was prepared in similar conditions as the ones of example 1c of WO2015/173437. Limestone was dispersed in water at 20-25° C. in a 5-liter reactor (without baffle). For the first step, $H_3PO_4$ (75%) was then added to this suspension and the mixture was stirred at 700 rpm using a 4-blade impeller. At the end of the addition of acid, the mixture was heated up to about 50° C., and a 25 wt % suspension of $Ca(OH)_2$ was added to maintain the pH of the suspension at 8.2-8.7 for the second step. The reaction time was 145 minutes. After the reaction time, the suspension is continually stirred at half the stirring speed than was used in the first step to allow it to cool down to 20-25° C. The final density of solid suspension in aqueous suspension (B) was 5% by weight (solid weight reported to total weight of the aqueous suspension).

The calcium phosphate (Ca/P) support S16 was prepared in similar conditions as the ones of example 1b of WO2015/173437. Limestone was dispersed in water at 20-25° C. in a 5-liter reactor (without baffle). For the first step, $H_3PO_4$ (75%) was then added to this suspension and the mixture was stirred at 320 rpm using a double 4-blade impeller. At the end of the addition of acid, the mixture was heated up to about 50° C., and a 25 wt % suspension of $Ca(OH)_2$ was added to maintain the pH of the suspension at 8.1-8.9 for the second step. The reaction time was 175 minutes. After the reaction time, the suspension is continually stirred at half the stirring speed than was used in the first step to allow it to cool down to 20-25° C. The final density of solid suspension in aqueous suspension (B) was 18% by weight (solid weight reported to total weight of the aqueous suspension).

1a. Porosity and Particle Size after Drying of the Support Samples S12, S14, S16

The porosity characteristics were determined after a heat treatment at 110° C. under vacuum overnight (about 16 hours). The BET specific surface area was determined by gas adsorption on a Micromeritics ASAP2020 machine. Before the analysis, the samples (0.7 to 1 g) are pretreated under vacuum at 110° C. until a stable vacuum of 4-5 µbar has been achieved. The measurements were carried out using nitrogen as adsorbent gas at 77° K via the volumetric method, according to the ISO 9277: 2010 standard (Determination of the specific surface area of solids by gas adsorption—BET method). The BET specific surface area was calculated in a relative pressure (P/PO) range varying from around 0.05 to 0.20.

The mean particles size D50 was also measured. The mean diameter D50 is the diameter such that 50% by weight of the particles have a diameter less than said value. The particle size measurement was carried out on a Beckman Coulter LS 230 laser diffraction particle size analyser (laser of wavelength 750 nm) on particles suspended in water and using a size distribution calculation based on Fraunhofer diffraction theory (particles greater than 10 µm) and on Mie scattering theory (particles less than 10 µm), the particles being considered to be spherical.

The results can be found in TABLE 1.

TABLE 1

| Samples No | BET* ($m^2/g$) | Av. Pore Volume ($cm^3/g$) | Av. Pore size (nm) | D50 (µm) |
|---|---|---|---|---|
| S12 | 166 | 0.45 | 8.9 | 26 |
| S14 | 181 | 0.59 | 9.5 | 21 |
| S16 | 166 | 0.56 | 9 | 73 |

*after thermal treatment at 110° C. under vacuum overnight

1b. Thermal Treatment (200-600° C.) of the Support Samples S12, S14, S16

Ageing of the 3 support samples at several temperatures (from 200° C. up to 600° C.) for 8 hours was carried out, in order to observe morphological changes of the samples as a function of temperature to check their thermal stability. The supports containing the hydroxyapatite will need to work in a wide temperature range (up to 600° C.) to be effective support for a deNOx catalyst.

Description of Method:

Around 10 g of the support samples (S12, S14, and S16) were put in ceramic crucibles and put in the electrical oven (Nabertherm, Germany, with temperature/time controller B-180). The thermal treatments were done in an air atmosphere under the following temperature program: from room temperature to the final temperature at 1° C./min and maintenance of the final temperature for a defined time of 8 hours. The resulting samples have been labelled with a code, which indicates the Temperature and time of the treatment (SXX/Temp./time): S12/200/8, S12/400/8, S12/600/8; S14/200/8, S14/400/8, S14/600/8, and S16/200/8, S16/400/8, S16/600/8.

The specific surface area (computed by the linear BET equation) and porosity (pore volume, pore size and pore size distribution) have been determined by N2 adsorption/desorption isotherms collected at −196° C. using an automatic analyzer of surface area on a Sorptomatic 1900 instrument, Italy. From the Slope and Intercept of the obtained line, the volume of N2 adsorbed on the surface in a monolayer (VM) and CBET constant have been calculated.

Pore size distribution (PSD) was computed by Barrett-Joyner-Halenda (BJH) model equation from the desorption branch of the collected isotherms and average pore size (rav,p, pore radius in nm or in A) was calculated by the classical Gurvitch's rule:

$$rav,p\ (Å)=(2Vp/SBET)10^4$$

$$rav,p\ (nm)=(2Vp/SBET)10^3$$

where Vp is the pore volume in $cm^3/g$, SBET is the BET surface area in $m^2/g$, and the pore radius is in Å or nm (1 Å=0.1 nm).

Prior to the analysis, the wet hydroxyapatite samples and the thermally treated samples (from 0.15 to 0.30 g) have been outgassed at 150° C. for 4 hours under vacuum.

From the results obtained (adsorption-desorption isotherms and pore-size distribution), the morphology of both the S12 and S14 samples changed with temperature. This is an expected phenomenon: sintering of solids with temperature is observed on (almost) all the solids.

Sintering causes loss of surface, decrease of pore volume and of pore size. In particular, the small pores disappear and large porosity appeared. The new porosity can be also associated with inter-particle voids. This is due to the decrease of the pore volume that results in the formation of larger volume (void) among the solid particles.

Concerning S12 and S14 support samples, surface area values started from an average value of surface area around 100 $m^2/g$ and then decrease down to values of 20 $m^2/g$ following thermal treatment at 600° C. Pore Size Distribution of the two samples was centered around 2-3 nm of pore radius (for low temperature of treatment) and it increased and became very broader for high temperatures of treatment.

Concerning S16 support sample, starting from an average value of surface area of 120 $m^2/g$, values of 30 $m^2/g$ have been observed following thermal treatment at 600° C. PSD of the sample is centered around 2 nm of pore radius (for low temperature of treatment) and it increases and become very broader for high temperatures of treatment.

Almost linear decreasing trend can be observed starting from 200° C. of thermal treatment for S12 and S14, while S16 follows a different trend. In the temperature range from 200° C. to 400° C., the decrease of surface area in S16 is limited, as well as the loss of pore volume (see TABLE 2).

TABLE 2

| Temp. (° C.) | sample | VM (Ncm³/g) | CBET | BET[b] | Pore vol.[c] (cm³/g) | Pore radius[d] (nm) | Avg pore radius[e] (nm) | PSD (A) |
|---|---|---|---|---|---|---|---|---|
| S12 110[a] | | | | 166[a] | | | | |
| 200 | S12/200/8 | 25.88 | −138 | 112.6 | 0.814 | 2 -; 2.5 | 14 | Broad |
| 400 | S12/400/8 | 15.50 | −65.4 | 67.5 | 0.636 | 1.5; 4 | 19 | Very broad |
| 600 | S12/600/8 | 4.583 | −31.5 | 20 | 0.441 | 2.5; 11 | 44 | Extremely broad |
| S14 110[a] | | | | 177 | | | | |
| 200 | S14/200/8 | 31.28 | −223 | 136.2 | 0.560 | 2; 3.5 | 8 | Broad |
| 400 | S14/400/8 | 20.04 | −128 | 87.3 | 0.992 | 1.5; 5; 8 | 23 | Very broad |
| 600 | S14/600/8 | 5.710 | −38.8 | 24.9 | 0.512 | 2; 11 | 40 | Extremely broad |
| S16 110[a] | | | | 162 | | | | |
| 200 | S16/200/8 | 27.50 | −171 | 120 | 0.9 | 1.5; 2.5 | 15 | Broad |
| 400 | S16/400/8 | 21.30 | −110 | 92.8 | 0.690 | 1.5; 5 | 15 | Very broad |
| 600 | S16/600/8 | 6.88 | −34.7 | 30 | 0.705 | 2; 18 | 47 | Extremely broad |

[a]determined after heat treatment at 110° C. under vacuum overnight (see Section 1a)
[b]determined from 2-parameters BET equation
[c]determined at $P/P° = 0.999$
[d]observed from PSD (by BJH model from desorption branch of the isotherm)
[e]determined from Gurvitch-rule: rp (nm) = (2 Vp/SBET) · $10^3$ with Vp in cm³/g and SBET in m²/g 1c. Evaluation of the Water Content The wet support samples (S12, S14, and S16) have been weighed in ceramic crucibles (ca. 10 g with precision on an analytical scale). The crucibles were put into an oven (Heraeus Instruments, Germany, vacutherm.) overnight (ca. 16 h) at 120° C. in static dry air atmosphere. After cooling to room temperature in a dryer, the crucibles were weighed again on an analytical scale.

The following losses of mass, corresponding to water desorption, were obtained and are shown in TABLE 3.

1d. Temperature Programmed Desorption of Water by TGA/DTGA

The wet samples (S12, S14, and S16) were put on the plate of the thermobalance (ca. 15 mg). The following three-step program on a TGA 7 PerkinElmer thermal analyzer was applied entirely done under N2 flowing: i) isothermal step at 35° C. for 2 min; ii) heating from 35° C. to 800° C., at controlled rate (10° C./min); iii) cooling from 800° C. to 50° C. A calibration of the temperature was performed by measuring the Curie transitions (TC) of high-purity reference materials (alumel, nickel, perkalloy, and iron: TC of 163°, 354°, 596°, and 780° C., respectively) at the same heating rate (b) employed for this analysis. For each sample, three analyses were carried out to check the reproducibility of the obtained results.

Total amount of water desorbed in the temperature interval 35° C.-800° C. are shown in TABLE 3. The determined values are in agreement with those evaluated from the simple mass determinations after treatment at 120° C. (see paragraph: 1c. Evaluation of water content). This indicates that the samples did not contain any impurity derived from the synthetic method.

1e. Temperature of Water Desorption:

The water desorption began almost at room temperature or little higher (at the starting of the TGA analysis, 35° C.) and it ended at the following temperatures: 105° C., 112° C., and 103° C. for S12, S14, and S16, respectively (evaluated by computing the end of the desorption process on the DTGA curve). The maximum rate of water desorption was observed at the following temperatures (Tmax) is shown in TABLE 3. After this phenomenon of water loss, any other desorption events at higher temperature could not be observed from the recorded thermogravimetric profiles.

TABLE 3

| Samples No | 1c water desorption | 1d - TGA/DTGA Total amount of water desorbed 35° C.-800° C. | 1e - TGA/DTGA $T_{max}$ (° C.) for maximum rate of water desorption |
|---|---|---|---|
| S12 | 47.9 ± 0.33% | 46.95 ± 0.57% | 80.9 ± 1.6° C. |
| S14 | 48.8 ± 0.03% | 51.29 ± 0.06% | 82.6 ± 1.2° C. |
| S16 | 51.2 ± 0.13% | 51.60 ± 0.50% | 81.6 ± 2.8° C. |

Example 2—Characterization of Support Composition

In this example a calcium phosphate (Ca/P) support labelled S97 was made under similar conditions as those described in example 1 of WO2015/173437 patent application. The sample was dried for 48 h at 105° C. in a drying oven. All analyses below have been carried on the dried sample.

The composition of the support was determined.

The calcium carbonate ($CaCO_3$) concentration was calculated from the following technique. An Orsat gas analyzer is an apparatus in which various gases, in this case $CO_2$, can be selectively absorbed by passing them through a series of preselected chemical solutions. The apparatus mainly consists of a calibrated water-jacketed gas burette, containing slightly acidified NaCl brine with a trace of a colour indicator (methyl orange). The burette is connected by glass capillary tubing to an absorption bottle containing a 4 M sodium hydroxide solution, which absorbs the $CO_2$ gas. By acidification and heating of the sample, carbonate is liberated as $CO_2$ gas. The volume of gas in the burette is read before and after absorption in the NaOH solution. The difference in volume corresponds to the $CO_2$ liberated from the sample. The quantity of carbonate is calculated from the volume of $CO_2$, taking the temperature of the water in the water-jacket of the burette into account as well as the atmospheric pressure.

The total calcium concentration was determined by potentiometric titration with EDTA solution using an indicative calcium electrode (ion selective electrode $Ca^{2+}$ electrode Metrohm 6.0508.110) and an Ag/AgCl reference electrode (Metrohm 6.0726.100). During titration an electronic voltmeter can be used to detect the change in potential between the two electrodes. The equivalence point of the titration corresponds to the jump in voltage observed when all the Ca is complexed by EDTA. The indicative calcium electrode detects the disappearance of free (uncomplexed) calcium. The titrator was Metrohm 799 GPT Titrino.

Inductively coupled plasma optical emission spectrometry (ICP-OES) was used to determine P and the minor elements Mg and Si. The magnesium carbonate ($MgCO_3$) concentration was calculated from the Mg concentration (measured by ICP-OES). The silicon dioxide ($SiO_2$) concentration was calculated from the Si concentration (measured by ICP-OES).

The water content was determined by colometric Karl-Fisher titration after thermal desorption at 300° C. The sample was heated in a dedicated tubular furnace for KF analysis and the desorbed water was swept by means of a dry argon gas flow into the colometric titration cell, containing the colometric Karl Fischer reagent (methanol, diethanolamine, sulfur dioxide, imidazole and imidazolium iodide).

The hydroxyapatite concentration was calculated from the Ca and P concentrations in the following way:

The molar Ca concentration to be assigned to hydroyxylapatite was calculated from the total % Ca concentration (determined by potentiometric titration with EDTA solution) minus the calcium already assigned to $CaCO_3$: 8.22 mol/kg The molar P concentration assigned to hydroxyapatite was calculated from the total % P concentration (measured by ICP-OES): 5.19 mol/kg Then the molar Ca/P ratio in the hydroxyapatite was calculated from these molar Ca and P concentrations assigned to hydroxyapatite. The estimated molar Ca/P ratio of the hydroxyapatite was 1.58, whereas the theoretical Ca/P of hydroxyapatite ($Ca_{10}(PO_4)_6(OH)_2$) is 1.67. Hydroxyapatites with a molar Ca/P ratio between 1.50 and 1.67 are calcium-deficient hydroxyapatite (CDA) with the chemical formula $$Ca_{10-x}(HPO_4)_x(PO_4)_{6-x}(OH)_{2-x}.$$

x has been calculated from the molar Ca/P ratio: x=10−6*Ca/P=0.503.

Thus, the exact chemical formula of the calcium-deficient hydroxylapatite was slightly different from the theoretical hydroxylapatite chemical formula: $Ca_{4.497}(HPO_4)_{0.503}(PO_4)_{5.497}(OH)_{1.497}$ with a molar mass of 976.41 g/mol.

The following TABLE 4 summarizes the estimated composition in wt % of the support sample S97. The sum of the compounds in the table above is slightly below 100% due to the experimental uncertainty associated with each of the analytical methods applied. The support contains no carbon.

TABLE 4

| Constituent | Concentration in wt % |
| --- | --- |
| (calcium-deficient) hydroxyapatite- Ca/P molar ratio = 1.58 | 84.5 |
| calcium carbonate | 9.1 |
| Water | 3.7 |
| magnesium carbonate | 0.8 |
| silicon dioxide | 0.3 |
| Total | 98.4 |

Absence of Calcium Dihydroxide ($Ca(OH)_2$) Demonstrated by pH Determination:

The support did not contain calcium dihydroxide ($Ca(OH)_2$). This absence of soluble hydroxide from calcium dihydroxide ($Ca(OH)_2$) was demonstrated by preparing a diluted sample suspension and by measuring the pH of the supernatant solution. Hydroxylapatite being extremely insoluble in water ($K_{sp}=6.8\times10^{-37}$), the $OH^-$ from the apatite molecule does not contribute to the pH. Calcium carbonate is also very insoluble (13 mg/l à 25° C.), whereas $Ca(OH)_2$ is soluble until 1.6-1.7 g/l at 20° C. If the pH of the sample solution is lower than 7, then the sample cannot contain any $Ca(OH)_2$. In order to demonstrate what the pH would be if the sample contained 0.1% calcium dihydroxide, the pH was also measured in a solution of a sample spiked with 0.1% calcium dihydroxide. The pH electrode was a calibrated Aquatrode Plus with Pt 1000 temperature sensor (Metrohm 6.0257.000).

Sample solution: 5 g of sample were brought into contact with degassed ultrapure water at about 20° C. during 10 min while stirring the liquid. The suspension was then centrifuged. At this concentration of sample in the solution, up to 1.6% of $Ca(OH)_2$ in the original solid sample would still be soluble. An aliquot of the supernatant was then diluted about 3 times and the pH was measured.

Solution of a sample spiked with 0.1% $Ca(OH)_2$: 5 g of sample+0.005 g $Ca(OH)_2$ were brought into contact with degassed ultrapure water during 10 min while stirring the liquid. The suspension was then centrifuged. An aliquot of the supernatant was then diluted about 3 times and the pH was measured.

The pH of the sample solution was 6.3. Since there is no alkalinity, there is no calcium dihydroxide in the sample. The pH of the sample spiked with 0.1% of calcium dihydroxide was 7.5. It was concluded that the support material did not contain calcium dihydroxide.

Example 3—Preparation of Catalysts

The catalyst samples prepared were identified by a code; in the code there were the Cu wt. % (X), the preparation method used (I: Impregnation or E:ion exchange), the Cu-precursor used (Ac: Acetate or Acac: Acetylacetonate or NO: nitrate or Cl: Chloride) and the support sample (S16 as used in Example 1).

3a—Examples of Catalyst Preparation by Impregnation

Catalyst Cu2IAcac/S16:

The support sample S16 was dried at 120° C. for 16 h=6.0549 g.

0.5042 g Cu(Acac) was dissolved in 150 ml of mixture water-isopropyl alcohol (1:1) (not clear solution) to reach a molar concentration of 0.016 M and put into contact with support sample.

1° step: Cu-deposition on S16 surface by using a rotary evaporator and a dropping-funnel, by alternating cycles of dropping of the Cu-solution and evaporation of the solvent (hot water maintained at 60° C.). The operation lasted 6 h.

2° step: drying of the impregnated powder in an oven at atmospheric pressure at 120° C., 16 h.

3° step: calcination: 1° C./min up to 450° C., maintained for 4 h.

5.151 g of catalyst sample was obtained with a Cu content of 1.98 Cu wt. %.

Catalyst Cu2IAc/S16:
The support sample S16 was dried at 120° C. for 16 h=6.049 g. 0.4060 g Cu(Ac) was dissolved in 20 ml water to reach a molar concentration of 0.108 M and put into contact with support sample.
1° step: Cu-deposition on S16 surface by using a rotary evaporator and a dropping-funnel, by alternating cycles of dropping of the Cu-solution and evaporation of water (hot water maintained at 80° C.). The operation lasted ca. 4-5 h.
2° step: drying of the impregnated powder in an oven at atmospheric pressure at 120° C., 16 h.
3° step: calcination: 1° C./min up to 450° C., maintained for 4 h.
5.286 g of a catalyst sample was obtained with a Cu content of 2.089 Cu wt. %.

3.b Example of Catalyst Preparation by Ion Exchange

Catalyst Cu8EAc/S16
Support S16 dried at 120° C., 16 h=5.9819 g
Cu(Ac): 2.4837 g was dissolved in 250 ml water to reach a molar concentration of 0.0497 M.
1° step: Addition of S16 powder into the clear solution of Cu(Ac) under vigorous magnetic stirring at 40° C. (pH=7), the operation lasted 20 h.
2° step: Separation of the solid from the solution by filtration under moderate vacuum (ca. 15 mbar); measurement of the absorbance of the filtrate waters to compute the residual Cu(Ac) concentration.
3° step: washing cycles with hot water (40° C.) up to the obtainment of clear water without any Cu(Ac) amount.
4° step: drying of the exchanged powder in an oven at atmospheric pressure at 120° C., 16 h
5° step: calcination, 1° C./min up to 450° C., maintained for 4 h.
Catalyst sample obtained g=5.546 (8.23 Cu wt. %)

Four more catalysts were prepared in a similar manner by ion exchange with 1.5 wt %, 3 wt %, 6 wt % and 11 wt % using copper acetate as Cu precursor
and identified as Cu1.5EAc/S16, Cu3EAc/S16, Cu6EAc/S16, Cu11EAc/S16. Catalyst Cu6ENO/S16 (dried; not calcined)
Support: S16 dried at 120° C., 16 h=5.123 g
Cu(NO3)2: 1.141 g was dissolved in water, 250 ml to reach a molar concentration of 0.024 M.
1° step: Addition of S16 powder into the clear solution of Cu(NO3)2 under vigorous magnetic stirring at 40° C. (pH=7), the operation lasted 20 h.
2° step: Separation of the solid from the solution by filtration under moderate vacuum (ca. 15 mbar); measurement of the absorbance of the filtrate to compute the residual Cu(NO3)2 concentration.
3° step: washing cycles with hot water (40° C.) up to the obtainment of clear water
4° step: drying of the exchanged powder in an oven at atmospheric pressure at 120° C., 16 h
Catalyst sample obtained g=5.075 (6.59 Cu wt. %)

Example 4—SCR Testing of Catalysts

4a. Preparation of Catalyst Loading into SCR Reactor

A continuous flow reactor was part of the Selective Catalytic Reaction system. When using such a flow reactor, the catalyst sample has to be put inside as grains of given size; placing solids in powder form would result in high pressure loss, with consequences of having non-correct fluid dynamics when feeding gaseous mixture. The dimension of the grains has to be selected so as to guarantee the absence of diffusional limits (external and internal diffusion) and a suitable fluid dynamics of the gaseous mixture.

For that reason, the catalyst samples to be tested were pressed, crushed, and sieved as particles of 45-60 mesh (0.354 mm-0.250 mm, respectively) in size. The procedure to realize such particles was not straightforward as the correct pressure had to be found experimentally in order to obtain catalyst grain sizes stable to mechanical shocks; the grains should not lose powder with time during the reaction.

For hydroxyapatite-based Cu catalyst samples tested for SCR reaction, the grains were obtained by pressing each powder sample put between two steel disks under 3 tons for 30 seconds. The resulting sample in form of compacted disk (of few mm thickness) was then crushed and sieved between two sieves of 45 and 60 mesh (0.354 mm-0.250 mm, respectively) of size.

4b. NH3-SCR Reaction Experimental Procedure

Tests of the SCR reaction were performed in a continuous reaction line equipped with a set of mass flow controllers (Bronkhorst, Hi-Tec and Brooks Instruments), a tubular vertical electric oven (maximum temperature of 1000° C.), a glass tubular catalytic micro reactor (with 5 mm i.d.), and an on-line FTIR spectrophotometer (Bio-Rad with DTGS detector) for the qualitative and quantitative determination of the fed and vented gaseous species.

A catalyst sample (ca. 0.20 g), sieved as particles of 0.35-0.25 mm of size and dried at 120° C. in an oven overnight, was pre-treated in situ under an O2/He flow (20% v/v) at 120° C. for 30 min.

Typically, when the catalyst activity was studied for a given temperature selected to be in the 120-400° C. range, the concentration of the feeding gas mixture and total flow rate were maintained constant via a Eurotherm Controller-Programmer type 818, and the temperature at which the reaction was being studied was maintained at least for 60 minutes in order to allow reaching steady-state conditions.

Typically, the fed gas mixture was prepared mixing ca. 500 ppm of NO, 500 ppm of NH3, and 10,000 ppm of O2. After the mixing, the effective gas mixture being fed to the catalyst bed also contained NO2 (formed from the reaction in gas phase between NO and O2): ca. 450 ppm of NO, 50 ppm of NO2, 500 ppm of NH3, and ca. 10,000 ppm of O2. The total flow of the gaseous mixture was kept constant at 6 NL/h (corresponding to 0.12 s of contact time).

The mixture exiting from the reactor was monitored each 180 seconds by FT-IR equipped with a multiple reflection gas cell with 2.4 m path length; resolution, 2 $cm^{-1}$; sensibility, 1.5, 92 scans per 180 seconds) for quantified the reagent species. The total absorbance of all the IR active species (Gram-Schmidt) flowing from the reactor was continuously monitored as a function of time, while the reaction temperature was changing. The NO, NO2, and NH3 and other formed species (if any) were quantified from the peak height of a selected absorbance lines, on the basis of the measured calibration factors.

The following TABLE 5 provides the working wavelengths ($cm^{-1}$) for the IR active species NO, NO2, N2O, NH3, H2O:

TABLE 5

| | Species | | | | |
|---|---|---|---|---|---|
| | NO | $NO_2$ | $N_2O$ | $NH_3$ | $H_2O$ |
| IR working wavelengths ($cm^{-1}$) | 1875.99 | 1626.40 | 590 | 966 | 1580 |

4C. NH3-SCR Catalytic Tests: Experimental Results with Support S16/400/8

As a control, the NH3-SCR reaction on the hydroxyapatite-based support (S16/400/8, calcined at 400° C. for 8 h) was studied over the range of temperature 120-450° C. while the concentration of the feeding mixture and flow rate were maintained the same (that is to say the contact time remained the same). The sample was prepared as explained in the Section 4.a. The sample was pre-treated under a flow of O2 in He (20%) at 3 NL/h for 30 min at 120° C. The feeding mixture contained NO, NH3, O2, as well as NO2 formed in gas phase from NO+O2.
Conditions for the Reaction Test:

| | |
|---|---|
| Flow | 6 (NL/h) |
| Surface Area | 92.76 (m2/g) |
| Cat. Density | 1 (g/ml) |
| Cat. Mass dry | 0.198 (g) |
| GHSV | 30272 (h−1) |
| Contact Time (t1) | 3.303E−05 (h) |
| Contact Time (t2) | 119 (g * s/NL) |
| Contact Time (t3) | 2.665 (g * s/mmol) |

From the concentration values of all the species involved in the SCR reaction, the catalytic data can be computed. FIG. 1 illustrates the conversion of NO and $NH_3$ over the hydroxyapatite-based support S16/400/8 over the range of temperature 120-450° C. Conversion of NO was around 15-20% and that of NO2 was much higher (ca. 60-70%); the reactivity of NO2 is much higher than that of NO. Ammonia, after being adsorbed at low temperature (120° C.), had conversion around 20-30% in the temperature range 200-450° C. These observations showed that S16/400/8 support sample was inert in the NH3-SCR reaction.

4d. NH3-SCR Catalytic Tests: Experimental Results with Two Catalysts Over Temperature Range The NH3-SCR reaction was studied on two catalysts prepared by ion-exchange on the same support S16 with copper acetate as a precursor (Cu1.5EAc/S16 and Cu11EAc/S16) over the range of temperature 120-400° C. while the concentration of the feeding mixture and flow rate were maintained the same (that is to say the contact time remained the same). The catalyst samples were made as explained in the Section 3b; their actual Cu contens were 1.725 wt % Cu and 11.14 wt % Cu. The catalyst samples were prepared and loaded in the SCR reactor as explained in the Section 4a. The catalyst sample was pre-treated under a flow of O2 in He (20% v/v) at 3 NL/h for 30 min at 120° C.
Conditions for the Reaction Test with Cu1.5EAc/S16:

| | |
|---|---|
| Flow | 6.01 (NL/h) |
| Cat. Density | 1 (g/ml) |
| Cat. Mass | 0.178 (g) |
| GHSV | 33688 (h−1) |
| Contact Time (t1) | 2.968E−05 (h) |
| Contact Time (t2) | 107 (g * s/NL) |
| Contact Time (t3) | 2.395 (g * s/mmol) |
| $PM_{CuO}$ | 79.55 (g/mol) |
| % Cu | 1.725 |

Conditions for the Reaction Test with Cu11EAc/S16:

| | |
|---|---|
| Flow | 6 (NL/h) |
| Cat. Density | 1 (g/ml) |
| Cat. Mass | 0.212 (g) |
| GHSV | 28355 (h−1) |
| Contact Time (t1) | 3.527E−05 (h) |
| Contact Time (t2) | 127 (g * s/NL) |
| Contact Time (t3) | 2.846 (g * s/mmol) |
| $PM_{CuO}$ | 79.55 (g/mol) |
| % Cu | 11.14 |

Figure 2:
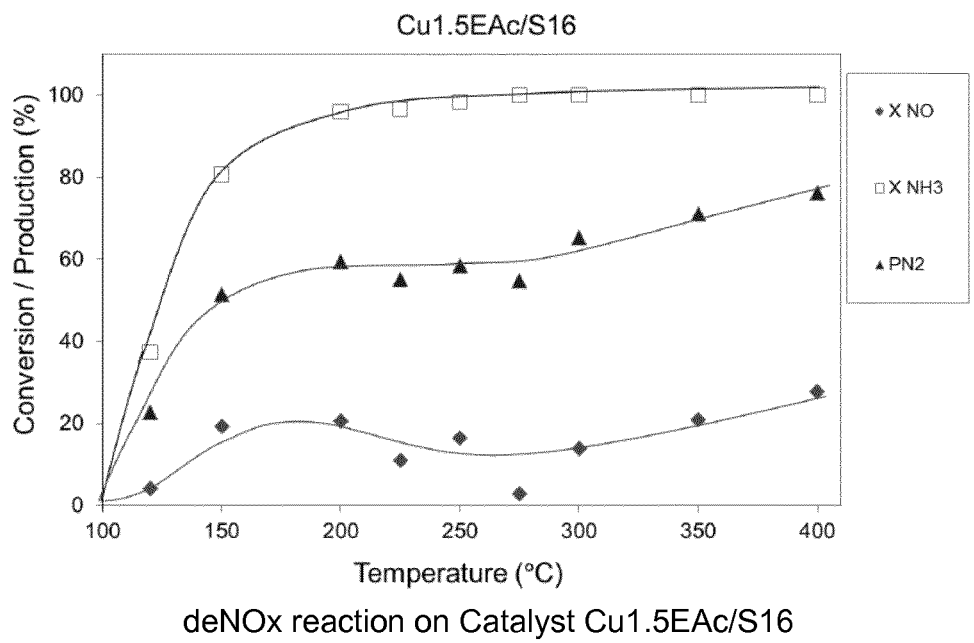
FIG. 2 illustrates the conversion of NO and $NH_3$ and the percent of production of $N_2$ over the range of temperature in a $NH_3$—SCR reaction test 120-400° C. for a hydroxyapatite-based Cu-exchanged catalyst with about 1.5 wt % Cu.
Figure 3:
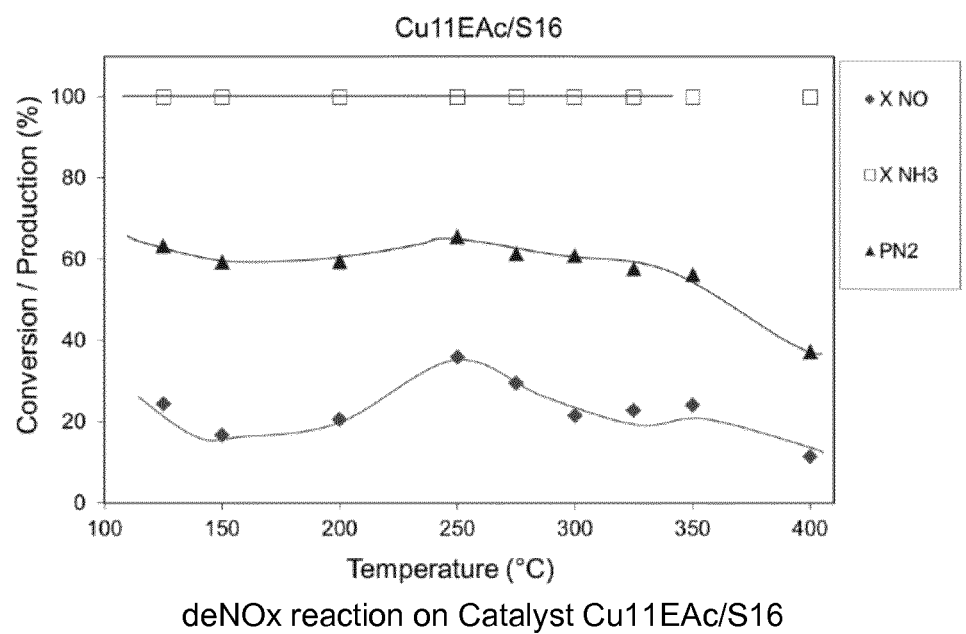
FIG. 3 illustrates the conversion of NO and $NH_3$ and the percent of production of $N_2$ over the range of temperature 120-400° C. in a $NH_3$—SCR reaction test for a hydroxyapatite-based Cu-exchanged catalyst with about 11 wt % Cu.

The percent conversion of NO and NH3 and the percent of production of N2 as a function of the reaction temperature are provided in FIGS. 2 and 3 over the hydroxyapatite-based Cu catalysts: Cu1.5EAc/S16 and Cu11EAc/S16, respectively, over the range of temperature 120-400° C.

For Cu11EAc/S16: the conversion of NO attained a maximum (ca. 36%) at 250° C. The production of N2 is largely higher than the NO conversion because N2 can be formed by both the reaction of NO reduction by NH3 and by $NH_3$ oxidation by O2. The production of N2 decreases at high temperatures of reaction because other species (N2O, NO, and NO2) are formed from NH3 oxidation by O2.

For Cu1.5EAc/S16: the conversion of NO had not a clear increasing trend, a certain increase of conversion was detectable up to 200° C. and then it was maintained on similar values; at the highest reaction temperatures, the NO conversion increased, likely due to the NO formation by the NH3 oxidation by O2. Ammonia conversion attained 100% starting from 275° C.

It was found that the curve describing the N2 production with temperature was interesting for Cu1.5EAc/S16, as it was continuously increasing with different slopes in the different ranges of temperature. At low reaction temperature, the N2 formation increased with high slope, then, the N2 formation was quite constant and for the highest temperatures it had a new increase of slope. The trend suggests that at low temperature, N2 comes from the NO reduction and at the highest temperatures, N2 comes from the NH3 oxidation by O2.

On this lower-loading catalyst, the competitive reaction of ammonia oxidation by oxygen did not seem very active and highly oxidized products such as N2O and NO2 were not observed, contrary to what was observed with the much-higher Cu loaded catalyst Cu11EAc/S16.

It seems that the loading of copper on the hydroxyapatite-based support (here S16) could alter the selectivity of the two reactions: oxidation of NH3 by NO with formation of N2 (see reaction I) and the various oxidation reactions of $NH_3$ by O2 with formation of NO, N2O, N2 (see reactions V, VI, VII).

4e. NH3-SCR Catalytic Tests: Experimental Results with Copper Exchanged Catalysts Seven copper catalysts at different Cu(II) concentration have been prepared by ionic exchange starting from different Cu-precursors and at different Cu concentrations (1.7<Cu (wt. %)<11.1): five catalysts made with copper acetate as a precursor (1.7<Cu (wt. %)<11.1), labeled Cu1.5EAc/S16, Cu3EAc/S16, Cu6EAc/S16, Cu8EAc/S16, and Cu11.2EAc/S16 with their actual Cu loadings being 1.725 wt % Cu, 2.761 wt % Cu, 6.041 wt % Cu, 8.228 wt % Cu, and 11.14 wt % Cu; one catalyst made with copper nitrate (6.59 Cu wt. % Cu) labeled Cu6ENO/S16; and one catalyst made with copper chloride (6.09 wt. % Cu) labeled Cu6ECl/S16. In their preparation, these catalysts were calcined at 400° C.

N2 adsorption and desorption isotherms (at −196° C.) on the copper catalysts were performed to evaluate the morphological properties of all the catalyst samples. Specific surface area was computed by interpreting the adsorption isotherms (in the interval of relative pressure: 0.033<P/Po<0.35) with the linear BET equation. Pore Volume was determined as converting all the amount of $N_2$-gas adsorbed (cm3/g) at P/Po=0.99 to N2-liquid (cm3liq/g). Pore size and pore size distribution were determined by interpreting the desorption branch of the N2 adsorption/desorption isotherms with the BJH (Barrett-Joyner-Halenda) model equation (extension of Kelvin equation). Average pore size (rav,p, pore radius in nm) was calculated by the classical Gurvitch's rule, which assumes cylindrical shape of the pores: rav,p (Å)=(2 VP/SBET) $10^4$. Prior to the analysis, the dried and weighted samples (ca. 0.2 g) have been outgassed at 150° C. for 4 hours under vacuum. The morphological properties (specific surface area, pore volume, pore size and pore size distribution) for the prepared Cu-exchanged catalysts are listed in TABLE 6.

TABLE 6

Copper catalysts prepared by ion exchange on S16

| Sample | Cu-precursor | Cu-loading Wt % | Surface Area[a] (m$^2$/g) | Pore Volume[b] (cm$^3$/g) | Pore radius[c] (nm) | Average pore radius[d] (nm) |
|---|---|---|---|---|---|---|
| S16 | | | 92.7 | 0.690 | — | 15 |
| Cu1.5EAc/S16 | CuAc | 1.72 | 75. | 0.484 | 1-6 | 12.5 |
| Cu3EAc/S16 | CuAc | 2.76 | 83.5 | 0.470 | 2-8 | 11.2 |
| Cu6EAc/S16 | CuAc | 6.04 | 79.1 | 0.749 | 2-8 | 18.9 |
| Cu8EAc/S16 | CuAc | 8.22 | 84.1 | 0.549 | 2-8 | 13.1 |
| Cu11EAc/S16 | CuAc | 11.14 | 97.4 | 0.567 | 2-9 | 11.6 |
| Cu6ENO/S16 (calc.) | CuNO | 6.59 | 81.4 | 0.312 | 2-7 | 7.67 |
| Cu6ENO/S16 (dry) | CuNO | 6.59 | 93.4 | 0.541 | 2-7 | 10.8 |
| Cu6ECl/S16 | CuCl | 6.09 | 78.3 | 0.636 | — | — |

[a]determined from 2-parameters BET equation
[b]determined at P/Po = 0.99
[c]observed from PSD (by BJH model from desorption branch of the isotherm)
[d]determined from Gurvitch-rule: rp (nm) = (2 Vp/SBET) · $10^3$ with Vp in cm$^3$/g and SBET in m$^2$/g For all of these ion-exchanged catalyst samples, the particle size distribution was broad; and the morphology of the materials was microporous and mesoporous.

XRD analysis showed that the ion-exchanged catalyst samples had a crystalline structure matching that of the hydroxyapatite (HAP) typical XRD pattern found in JCPDS: 00-009-0432.

For the Cu-exchanged catalysts, the BET surface area was comprised in the range of 75-98 m$^2$/g; it seems that the BET values increased with the Cu content, supporting the formation of nanoaggregates of CuO at the external surface of the support (S16). In general, the surface area values were slightly lower than that of the (non-loaded) S16 support (92.7 m$^2$/g measured after calcination at 400° C.; 15 nm in av. pore radius). There was no significant modification of the computed BET values by increasing the Cu concentration on the catalyst. This indicated a good distribution of Cu species on the S16 support. For the Cu-exchanged catalysts, the pore volume was comprised in the range of 0.312-0.749 cm$^3$/g (compared to 0.69 cm$^3$/g pore volume measured after calcination at 400° C. for the support S16).

The $NH_3$-SCR reaction was studied for these seven catalysts prepared by ion-exchange on the same support S16 at a given temperature of 250° C.—the concentration of the feeding mixture and flow rate were maintained the same (that is to say the contact time remained the same). The catalyst samples were prepared and loaded in the SCR reactor as explained in the Section 4a. The catalyst sample was pre-treated under a flow of O2 in He (20% v/v) at 3 NL/h for 30 min at 120° C.

Figure 4:
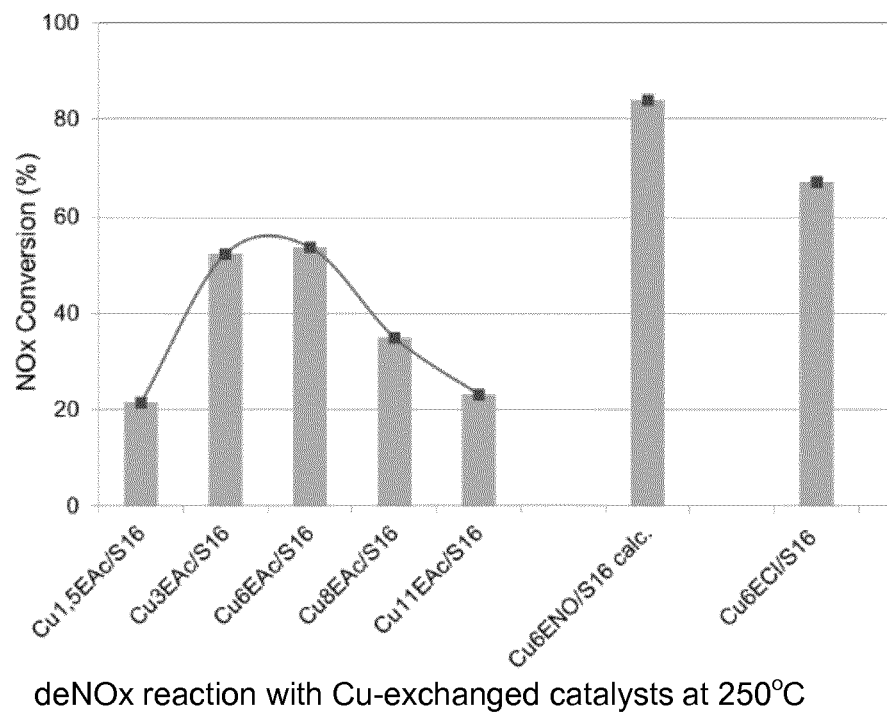
FIG. 4 reports the comparative results for the deNOx activity at temperature of 250° C. of the 7 Cu-catalysts prepared by ionic exchange with Cu-loading on hydroxyapatite support from 1.7 to 11.1 wt. % Cu.

The percent conversion of NOx obtained with a NH3:NO molar ratio of 0.82 are provided in FIG. 4 over the 7 hydroxyapatite-based Cu catalysts over the given temperature of 250° C. with:
  a NH3:NO molar ratio of 0.82,
  a contact time of 3.01 $10^{-5}$ hour,
  an O2 concentration of 10,000 ppm and
  an initial NO concentration of about 550 ppm.

FIG. 4 reports the comparative results for the DeNox activity at temperature of 250° C. of the 7 Cu-catalysts prepared by ionic exchange with Cu loadings on hydroxyapatite support from 1.7 to 11.1 wt. % Cu (Conditions: NOx=580 ppm; NH3=500 ppm; O2=1%; GHSV=30,000 h$^{-1}$; catalyst=0.2 g).

If copper acetate was used as precursor of the copper phase deposited via ion-exchange, a Cu-content around 3-6 wt. % Cu3EAcS16 and Cu6EAcS16 seemed representing the optimal Cu concentration for obtaining active deNOx catalysts. The catalysts attained good conversion of NO (they were active in the NH3-SCR of NOx) and they did not suffer as much from the competitive reaction of NH3 oxidation by O2 with formation of NO, N2O, N2 (via reactions V, VI, VII). Further addition of Cu did not improve the NOx conversion attained.

Quite surprisingly though, the catalysts prepared from Cu(NO3)$_2$ and CuCl2 precursors (Cu6ENO/S16, Cu6ECl/S16) gave much higher NOx conversion comparing with the catalysts prepared with copper acetate precursor. Likely, the double ionic nature of the anion ($NO^{3-}$ and $Cl^-$) and cation ($Cu^{2+}$) of the Cu-salt precursors could modify the hydroxyapatite surface involving also the $PO_4^{3-}$ sites that can be substituted with the entered anions, this likely led to positive consequences on deNOx activity.

Figure 5:
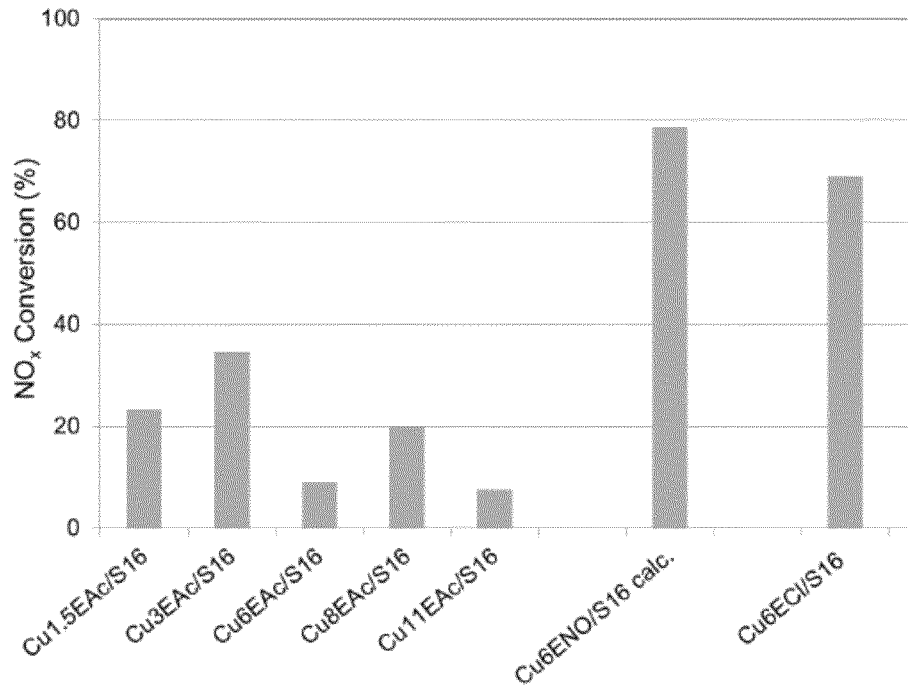
FIG. 5 reports the comparative results for the deNOx activity at temperature of 350° C. of the same 7 Cu-catalysts prepared by ionic exchange as used in FIG. 4.

FIG. 5 reports the comparative results for the DeNox activity at temperature of 350° C. of the same 7 Cu-catalysts prepared by ionic exchange with Cu loadings on hydroxyapatite support from 1.7 to 11.1 wt. % Cu (Conditions: NOx=580 ppm; NH3=500 ppm; O2=1%; GHSV=30,000 h$^{-1}$; catalyst=0.2 g). All Cu catalysts prepared by ionic exchange from copper acetate showed a decrease of activity at 350° C. in comparison with the activity shown at 250° C. (FIG. 4). This corresponds to the typical trend of the most part of deNOx catalysts reported in the open literature. The catalysts prepared from copper salt (nitrate, chloride) precursors (Cu6ENO/S16 and Cu6ECl/S16) were highly selective, their deNOx activity did not decrease significantly at 350° C. in comparison with that measured at 250° C.

4f. NH3-SCR Catalytic Tests: Experimental Results with Copper Impregnated Catalysts Six copper catalysts at different Cu(II) concentration have been prepared by impregnation starting from different Cu precursors and at different Cu concentrations (2.1<Cu (wt. %)<10.1): four catalysts made with copper acetate (2.1<Cu (wt. %)<10.1) labeled Cu2IAc/S16, Cu6IAc/S16, Cu8IAc/S16, and Cu10IAc/S16, one catalyst made with copper nitrate (6.1 Cu wt. %) labelled Cu6INO/S16; and one catalyst made with copper acetylacetonate (2.0 wt. % Cu) labeled Cu2IAcAc/S16.

N2 adsorption and desorption isotherms (at −196° C.) on the copper catalysts were performed to evaluate the morphological properties of all the catalyst samples as described above in Example 4e. The morphological properties (specific surface area, pore volume, pore size and pore size distribution) for the prepared Cu-impregnated catalysts are listed in TABLE 7.

TABLE 7

Copper catalysts prepared by impregnation on S16

| Sample | Cu-precursor | Cu-loading Wt % | Surface Area$^a$ (m$^2$/g) | Pore Volume$^b$ (cm$^3$/g) | Pore radius$^c$ (nm) | Average pore radius$^d$ (nm) |
|---|---|---|---|---|---|---|
| S16 | | | 92.7 | 0.690 | — | 15 |
| Cu2IAc/S16 | CuAc | 2.09 | 85.0 | 0.518 | 2-8 | 12.2 |
| Cu6IAc/S16 | CuAc | 5.77 | 73.4 | 0.784 | 2-8 | 21.4 |
| Cu8IAc/S16 | CuAc | 7.79 | 67.8 | 0.800 | — | — |
| Cu10IAc/S16 | CuAc | 10.09 | 66.2 | 1.101 | — | — |
| Cu2IAcAc/S16 | CuAcac | 1.98 | 76.4 | 0.702 | — | — |
| Cu6INO/S16 | CuNO | 6.10 | 79.8 | 0.814 | — | — |

$^a$determined from 2-parameters BET equation
$^b$determined at P/Po = 0.99
$^c$observed from PSD (by BJH model from desorption branch of the isotherm)
$^d$determined from Gurvitch-rule: rp (nm) = (2 Vp/SBET) · 10$^3$ with Vp in cm$^3$/g and SBET in m$^2$/g For all of these impregnated catalyst samples, the particle size distribution was broad; and the morphology of the materials was microporous and mesoporous.

XRD analysis showed that the impregnated catalyst samples had a crystalline structure matching that of the hydroxyapatite (HAP) typical XRD pattern found in JCPDS: 00-009-0432 as well as the XRD pattern found for CuO JCPDS: 048-1548 pattern (from literature).

For the Cu-impregnated catalysts, the BET surface area was comprised in the range of 66.2-85 m$^2$/g, slightly lower than that of the (non-loaded) S16 support (92.7 m$^2$/g measured after calcination at 400° C.). For the Cu-impregnated catalysts, the pore volume was comprised in the range of 0.52-1.1 cm$^3$/g (compared to 0.69 cm$^3$/g pore volume measured after calcination at 400° C. for the support S16).

Figure 6:
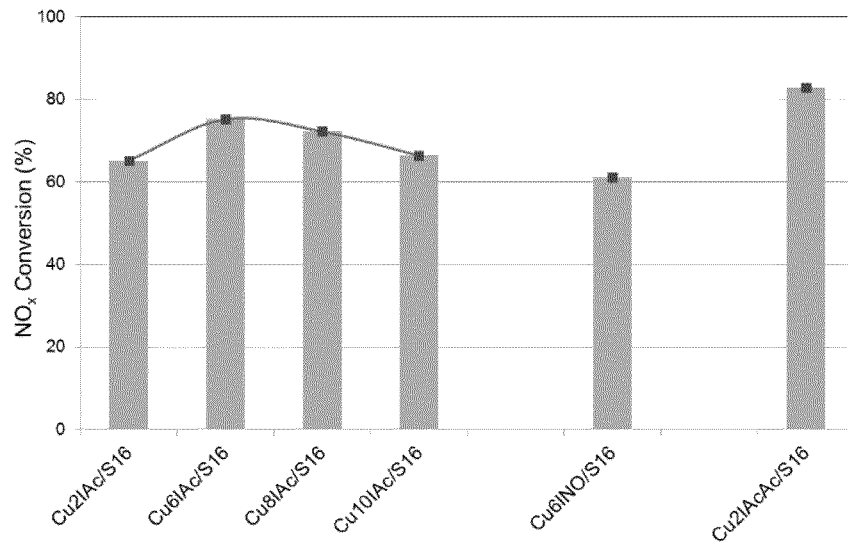
FIG. 6 reports the comparative results for the deNOx activity at temperature of 250° C. of the 5 Cu-catalysts prepared by impregnation with Cu-loading (2.1<Cu (wt. %)<10.1) on hydroxyapatite-containing support.

Comparison of deNOx activity of all the catalysts prepared by impregnation at different Cu concentrations and prepared from various Cu precursors (copper acetate, copper nitrate, and copper chloride) is reported in FIG. 6 at temperature of 250° C. (Conditions: NOx=580 ppm; NH3=500 ppm; O2=1%; GHSV=30,000 h$^{-1}$; catalyst=0.2 g). In this case, the NOx conversion observed at 250° C. was much higher (70-80%) than that shown by the catalysts prepared by ionic exchange. The catalyst activity was quite the same independently of the Cu loading and of the nature of Cu precursor.

The deNOx activity of Cu2IAcAc/S16 (the sample prepared from acetylacetonate precursor) was very high. This result was surprising because the preparation of the support sample was challenging, due to solubility problems of the precursor both in water and in several organic solvents. Even though there was some issue with the catalyst preparation which likely resulted in not an homogeneous dispersion of Cu phase on the hydroxyapatite support, the observation of high deNOx activity (despite the likely poor Cu dispersion) indicated that the NOx reductions required the presence of aggregates of CuOx on the surface.

Figure 7:
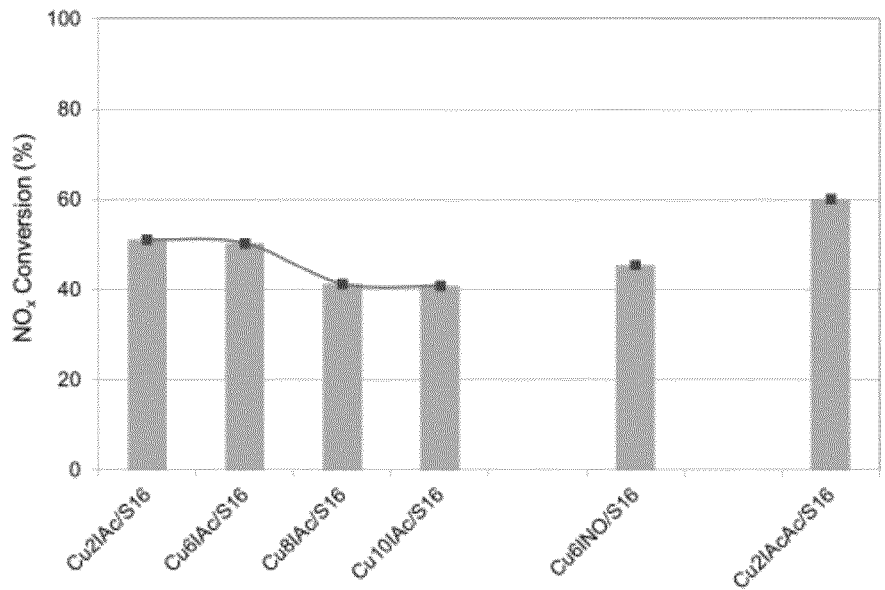
FIG. 7 reports the comparative results for the deNOx activity at temperature of 350° C. of the same 5 Cu-catalysts prepared by impregnation as used in FIG. 6.

FIG. 7 reports the comparative results for the deNOx activity at temperature of 350° C. of the same 5 Cu-catalysts prepared by impregnation with Cu loadings on hydroxyapatite support (2.1<Cu (wt. %)<10.1). Conditions: NOx=580 ppm; NH3=500 ppm; O2=1%; GHSV=30,000 h$^{-1}$; catalyst=0.2 g.

4g. NH3-SCR Catalytic Tests: Impact of Method of Preparation of Catalysts

Figure 8:
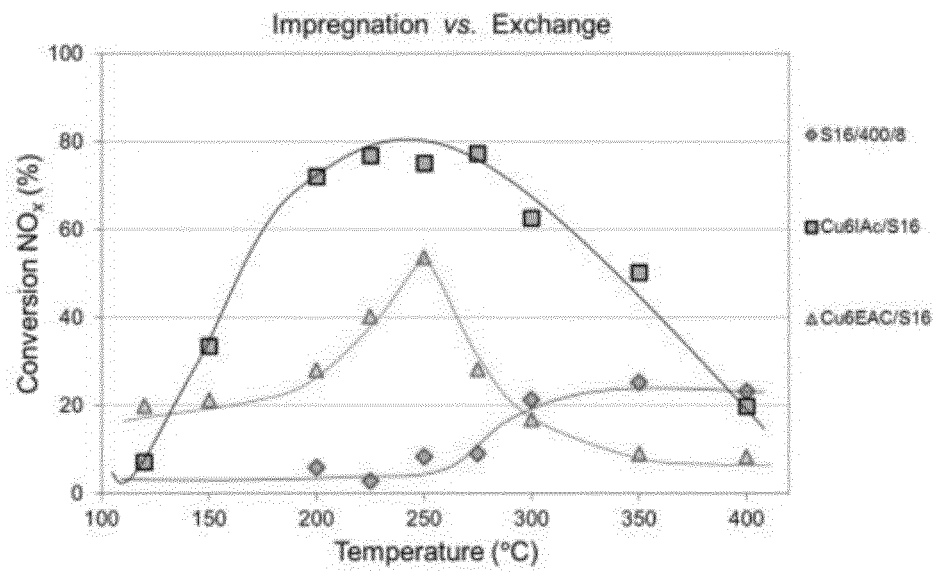
FIG. 8 shows that copper on the support is needed for the deNOx activity at low temperatures (150-300° C.) and that impregnation seems a better preparation method than the ionic exchange method when copper acetate is used as Cu-precursor.

Two catalysts at the same Cu loading on S16 support (Cu6IAc/S16 and Cu6EAc/S16) were prepared by the 2 different methods of Cu deposition (ion exchange vs. impregnation) as described above in sections 3a and 3b. They were compared towards their deNOx activity (see FIG. 8). FIG. 8 shows that the Cu presence was necessary for the deNOx activity at low temperatures (150-300° C.) and that impregnation seemed a better preparation method than ionic exchange method when copper acetate was used as Cu precursor.

For comparison purposes, deNOx activity of the two catalysts prepared on a chabazite ("HCZC") support by ion exchange and impregnation at similar copper loading of 2 wt % Cu (Cu2EAc/HCZC and Cu2IAc/HCZC). In this case, it was observed that the preparation method did not influence very much the performances of the obtained catalysts. Both the catalysts had good deNOx activity in a wide range of temperatures.

4h. NH3-SCR Catalytic Tests: Impact of Cu Precursor on Catalyst's Activity

The NOx conversion was measured as a function of reaction temperature for the catalysts prepared by ion exchange for a given with different cupper precursors (Cu6EAc/S16; Cu6ECl/S16; Cu6ENO/S16) over a range of temperatures (120-400° C.). The data is illustrated in FIG. 9.

Figure 9:
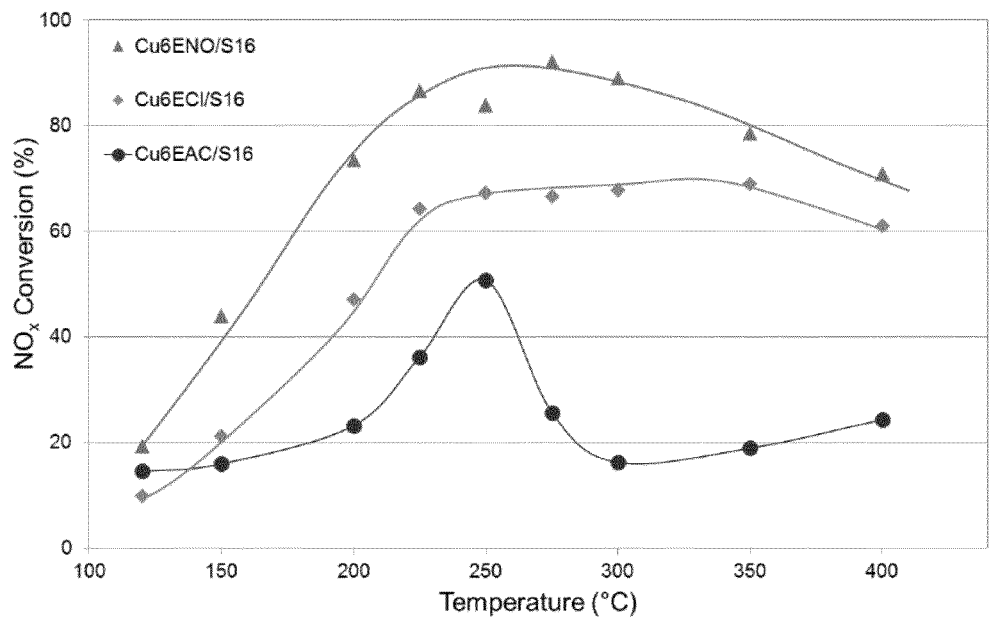
FIG. 9 illustrates the conversion of NOx over 3 hydroxyapatite-based Cu-catalysts made by ionic exchange and from 3 different copper precursors over the range of temperature 120-400° C. in a $NH_3$—SCR reaction test.

FIG. 9 indicates that there was a variation between the catalyst samples prepared from Cu-acetate, Cu-nitrate, and Cu-chloride. The catalysts prepared starting from copper nitrate and copper chloride precursors showed very similar behavior of their catalytic performances in the deNOx reaction. Their activities are both higher than that observed on Cu6EAc/S16 (catalyst prepared from Cu-acetate precursor). The most important difference among the three catalysts was in their catalytic behavior at high temperature (>250° C.): Cu6ENO/S16 and Cu6ECl/S16 maintain good deNOx activity, with only slight decrease of NOx conversion. It emerges that Cu6ENO/S16 had the best activity, also better than that observed on Cu6ECl/S16.

From FIG. 9, it seems that the ionic salts used as Cu-precursors (Cu-chloride and Cu-nitrate) gave rise to very similar deNOx activity.

The invention claimed is:
1. A process for treating a waste gas stream containing nitrogen oxides (NOx) and contaminants selected from the group consisting of heavy metals, acid gases and combinations thereof, said waste gas stream originating from a combustion process, said treating process comprising:
   injecting an alkali sorbent comprising a compound selected from the group consisting of sodium bicarbon- ate, sodium carbonate, sodium sesquicarbonate (trona), quick lime, hydrated lime, limestone, and combinations thereof;

contacting at least a portion of the contaminants with the alkali sorbent to remove at least a portion of the contaminants from the waster gas stream, injecting an ammonia source into the waste gas stream;

injecting a catalyst into the waste gas stream; and converting, in the presence of $O_2$, by reduction with $NH_3$ of at least a portion of the NOx in the waste gas stream to $N_2$ and water at a temperature of at least 100° C. and at most 600° C., wherein the catalyst comprises an active catalyst component deposited on a porous support;

wherein said active catalyst component comprises copper, copper oxide, or combination thereof; and wherein said porous support comprises at least 60 wt % of a calcium-deficient hydroxyapatite having a calcium to phosphate molar ratio (Ca/P) of less than 1.67.

2. The process according to claim 1 wherein the porous support of the catalyst further comprises calcium carbonate in an amount of less than 20 wt % and more than 0 wt %.

3. The process according to claim 1, wherein the porous support of the catalyst comprises less than 1 wt % of calcium dihydroxide $Ca(OH)_2$.

4. The process according to claim 1, wherein the porous support of the catalyst further comprises water in an amount of less than 20 wt % and more than 0 wt %.

5. The process according to claim 1, wherein the porous support of the catalyst comprises a Ca/P molar ratio greater than the Ca/P molar ratio of the calcium-deficient hydroxyapatite.

6. The process according to claim 1, wherein the porous support of the catalyst comprises a Ca/P molar ratio of 1.60 or more.

7. The process according to claim 1, wherein the porous support of the catalyst comprises:
at least 65 wt % of the calcium-deficient hydroxyapatite, and/or comprises
at most 99 wt % of the calcium-deficient hydroxyapatite.

8. The process according to claim 1, wherein the porous support has a specific BET surface area of at least 110 $m^2/g$ and a pore volume of at least 0.5 $cm^3/g$ after a heat treatment at 200° C.

9. The process according to claim 1, wherein the catalyst has a pore volume measured after being calcined at 400° C. of:
at least 0.3 $cm^3/g$ and/or
at most 1.1 $cm^3/g$.

10. The process according to claim 1, wherein the active catalyst component comprises:
at least 0.1 wt % of copper, copper oxide, or combination thereof;
and/or
at most 15 wt % of copper, copper oxide, or combination thereof.

11. The process according to claim 1, wherein the active catalyst component is deposited on the porous support by ion exchange or impregnation using a copper precursor selected from the group consisting of copper nitrate, copper acetate, copper chloride, copper acetylacetonate, and any mixture thereof.

12. The process according to claim 1, wherein the alkali sorbent comprises a compound selected from the group consisting of trona, sodium bicarbonate, and mixture thereof.

13. The process according to claim 1, wherein the alkali sorbent contains an ammonia source.

14. The process according to claim 1, wherein the weight ratio of the catalyst to said alkali sorbent is
at least 0.001; and/or
at most 1.00.

15. The process according to claim 1, wherein the alkali sorbent and the catalyst are mixed to form a blend to be injected simultaneously into the waste gas stream, and wherein the blend comprises
at least 0.1 wt % of the catalyst, and/or
at most 20 wt % of the catalyst.

16. The process according to claim 1, wherein the alkali sorbent and the catalyst are injected sequentially into the waste gas stream flowing through a duct, and wherein the alkali sorbent is injected in a duct at a location upstream of where the catalyst is injected.

17. The process according to claim 1, wherein the ammonia source and the catalyst are injected simultaneously into the waste gas stream.

18. A blend comprising an alkali sorbent and a catalyst,
said alkali sorbent comprising a compound selected from the group consisting of sodium bicarbonate, sodium carbonate, sodium sesquicarbonate (trona), quick lime, hydrated lime, limestone, and combinations thereof,
wherein the blend comprises
at least 0.1 wt % of the catalyst, and/or
at most 20 wt % of the catalyst;
said catalyst comprising an active catalyst component deposited on a porous support; wherein said active catalyst component comprises copper, copper oxide, or combination thereof;
wherein said porous support comprises at least 60 wt % of a calcium-deficient hydroxyapatite having a calcium to phosphate molar ratio (Ca/P) of less than 1.67.

19. A process for treating a waste gas stream containing nitrogen oxides (NOx) and contaminants selected from the group consisting of heavy metals, acid gases and combinations thereof, said waste gas stream originating from a combustion process, said treating process comprising:
injecting the blend according to claim 18 into the waste gas stream;
removing at least a portion of the contaminants from the waste gas stream with the alkali sorbent, and
converting, in the presence of $O_2$, by reduction with $NH_3$ of at least a portion of the NOx in the waste gas stream to $N_2$ and water at a temperature of at least 100° C. and at most 600° C.

20. The process according to claim 1, wherein the temperature is at least 105° C. and/or at most 400° C.

* * * * *